United States Patent
Yaoita et al.

(10) Patent No.: US 7,638,184 B2
(45) Date of Patent: *Dec. 29, 2009

(54) LAMINATED GLASS FOR VEHICLE WINDOW

(75) Inventors: Kazuya Yaoita, Tokyo (JP); Takahira Miyagi, Tokyo (JP); Yoshihito Katayama, Tokyo (JP); Yukio Kimura, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/033,407

(22) Filed: Feb. 19, 2008

(65) Prior Publication Data

US 2008/0206533 A1  Aug. 28, 2008

Related U.S. Application Data

(63) Continuation of application No. PCT/JP2006/315160, filed on Jul. 31, 2006.

(30) Foreign Application Priority Data

Aug. 16, 2005 (JP) .............................. 2005-235726
Sep. 2, 2005 (JP) .............................. 2005-254904

(51) Int. Cl.
- *G02B 5/08* (2006.01)
- *G02B 5/20* (2006.01)
- *F21V 9/04* (2006.01)
- *B32B 7/00* (2006.01)

(52) U.S. Cl. .......................... 428/213; 428/212; 428/34; 359/359; 359/360; 359/580; 359/584; 359/586

(58) Field of Classification Search ...................... None
See application file for complete search history.

(56) References Cited

U.S. PATENT DOCUMENTS

| 5,073,451 | A  | * | 12/1991 | Iida et al. ..................... 428/336 |
| 6,329,061 | B2 | * | 12/2001 | Kondo .......................... 428/432 |
| 6,391,400 | B1 | * | 5/2002  | Russell et al. ................. 428/34 |
| 2001/0031365 | A1 | * | 10/2001 | Anderson et al. ........... 428/432 |

FOREIGN PATENT DOCUMENTS

JP  58-26622  2/1983

(Continued)

*Primary Examiner*—David R Sample
*Assistant Examiner*—April C Inyard
(74) *Attorney, Agent, or Firm*—Oblon, Spivak, McClelland, Maier & Neustadt, L.L.P.

(57) ABSTRACT

To provide a laminated glass for a vehicle window which can prevent the temperature increase in a vehicle.

A laminated glass for a vehicle window which comprises a glass plate 12 to be disposed on the car exterior side when the laminated glass 1 is assembled in a vehicle, and an infrared reflection film 21 provided on the side of an infrared shielding interlayer 30 having infrared shielding fine particles dispersed therein, of the glass plate 12, wherein the reflectance to light at all wavelengths of from 900 to 1,100 nm is from 30 to 50%, the absorptivity to light at all wavelengths of from 1,100 to 1,300 nm is from 35 to 60%, and the transmittance to light at all wavelengths of from 900 to 1,500 nm is at most 30%.

14 Claims, 8 Drawing Sheets

FOREIGN PATENT DOCUMENTS

| | | |
|---|---|---|
| JP | 64-19306 | 1/1989 |
| JP | 1-138159 | 5/1989 |
| JP | 2-149803 | 6/1990 |
| JP | 9-52738 | 2/1997 |
| JP | 2001-151539 | 6/2001 |
| JP | 2003-500249 | 1/2003 |
| JP | 2004-26547 | 1/2004 |
| JP | 2005-89244 | 7/2005 |

* cited by examiner

LAMINATED GLASS FOR VEHICLE WINDOW

TECHNICAL FIELD

The present invention relates to a laminated glass to be used for a window of a vehicle.

BACKGROUND ART

Some window glass for vehicles particularly for automobiles has an infrared reflection film to prevent an increase in the car interior temperature. Heretofore, to obtain a high infrared reflection performance, an electrically conductive thin film represented by a silver type metal thin film has been used for the infrared reflection film. However, if the electrically conductive thin film is laminated on a glass plate, a radio wave transmission performance remarkably decreases. Further, in such a case, the decrease in the radio wave transmission performance is a decrease over a wide range of from the near infrared region to the radio wave region. The decrease in the radio wave transmission performance leads to malfunction of an infrared sensor such as an optical beacon or a rain sensor or decrease in receiving performance of a television, a radio or the like. Therefore, a window glass having a high infrared reflection performance has hardly been mounted on a vehicle having such a function.

Therefore, as a window glass shielding infrared rays while securing the radio wave transmission performance, a laminated glass employing an interlayer made of a polyvinyl butyral (PVB) or the like having infrared shielding fine particles dispersed therein (hereinafter referred to as a "fine particles-dispersed interlayer") (e.g. Patent Document 1, hereinafter a laminated glass of this type will be referred to as a "fine particles-containing laminated glass") has been employed. With respect to the fine particles-containing laminated glass, for example, by use of tin-doped indium oxide (hereinafter referred to as "ITO") fine particles as the infrared shielding fine particles, an infrared shielding performance can be imparted to the interlayer by the ITO fine particles, and in addition, since the ITO fine particles are dispersed, the decrease in the sheet resistance of the interlayer can be prevented. Accordingly, the fine particles-containing laminated glass is useful as a window glass shielding infrared rays while securing the radio wave transmission performance.

However, the fine particles-containing laminated glass is considered to have the following disadvantages as a window glass which is required to have a higher infrared shielding performance. One is a not so high shielding properties against light in the infrared region, e.g. at a wavelength in the vicinity of 1,000 nm (e.g. prior art in Patent Document 2). The other is the fine particles-dispersed interlayer absorbing infrared rays, thus leading to reradiation of the absorbed solar energy to the car interior (e.g. prior art in Patent Document 3).

Patent Document 1: JP-A-2001-151539
Patent Document 2: JP-A-2005-89244
Patent Document 3: JP-A-2004-26547

DISCLOSURE OF THE INVENTION

Object to be Accomplished by the Invention

In Patent Document 2, on one of glass plates constituting the fine particles-containing laminated glass, an infrared reflection film comprising a low refractive index layer and a high refractive index layer periodically laminated is provided. It is disclosed that a high heat insulating performance can be realized by such a structure.

In Patent Document 3, a fine particles-dispersed interlayer is disposed between a car exterior side glass plate and a car interior side glass plate, and in addition, an infrared reflection film comprising an optical interference multilayer film having multilayers of two polymer thin films differing in the refractive index laminated is disposed between the car exterior side glass plate and the fine particles-dispersed interlayer. It is disclosed that an energy radiated to the car interior side is suppressed by such a structure (as an example of the infrared reflection film, U.S. Pat. No. 6,049,419 is cited in Patent Document 3).

However, the fine particles-containing laminated glass disclosed in these documents does not have so high heat insulating performance as it is said. That is, even by such a fine particles-containing laminated glass, it is impossible to achieve a solar reflectance $R_e$ of at least 20% while suppressing the solar transmittance $T_e$ to be at most 45%. When such a fine particles-containing laminated glass is used for a vehicle window, since it has a low reflectance, the amount of absorption of the solar energy in the laminated glass must be increased so as to suppress the transmittance. As a result, the increase in the car interior temperature can not sufficiently be suppressed due to the reradiation of the solar energy absorbed in the laminated glass to the car interior side, which is specifically indicated by the following Table 1.

Table 1 shows examples of representative laminated glasses in the respective Patent Documents showing a maximum value or a minimum value of the solar transmittance and the solar reflectance. In Table, "Doc" means Patent Document numbers, "Ex." means Examples in Patent Documents 2 and 3, "$T_e$" means the solar transmittance of the laminated glass in each Example, "$R_e$" means the solar reflectance of the laminated glass in each Example, and "upper" and "lower" in the column "Ex." means Examples of the laminated glasses in the upper and lower stages in Table 1 in Patent Document 3.

TABLE 1

| Doc. | Ex. | $T_e$ (%) | $R_e$ (%) |
|---|---|---|---|
| 2 | 5 | 54.7 | 7.8 |
| 2 | 6 | 59.9 | 10.4 |
| 2 | 11 | 54.8 | 9.5 |
| 3 | Upper | 48 | 22 |
| 3 | Lower | 41 | 10 |
| 3 | 1 | 38.0 | 18.1 |
| 3 | 4 | 39.2 | 18.2 |
| 3 | 5 | 38.2 | 18.0 |

As the infrared reflection film in Patent Document 2, a single layer film of a metal, an oxide or a nitride or a laminated film thereof is used, and the thickness of each layer is at most 10 nm in the case of a metal film or at most 15 nm in the case of a nitride. Further, in Examples, oxides including ZnO, CrO, NiCrO, TiO, SSTO (an oxide of stainless steel), SnO and SiO are used, and these films have a thickness of from several nm to several tens nm (38 nm at thickest).

A film to reflect light in a specific wavelength region is required to have an "optical thickness" which is an integral multiple of $\lambda/4$ ($\lambda$ is the wavelength of light to be reflected). With reference to light at 800 nm at the short wavelength side in the near infrared region as an example, the optical thickness of the near infrared reflection film (each layer in the case of a laminated film) is at least 200 nm.

The "optical thickness" of each layer is represented by the product of its "geometrical thickness" and the "refractive index of a material constituting the layer". Accordingly, even when a material having a high refractive index such as titanium oxide (the refractive index is supposed to be 2.4) is used, the geometrical thickness of the film is at least about 80 nm. Namely, it is considered that no optical thickness required for infrared reflection can be obtained from the geometrical thickness of the film and the refractive index of the material disclosed in Patent Document 2. Accordingly, the infrared reflection film disclosed in Patent Document 2 is considered to have insufficient heat insulating performance.

Further, the laminated glass disclosed in Patent Document 3 is considered to be superior in the heat insulating performance to the laminated glass disclosed in Patent Document 2, with regard to the $T_e$ (%) and $R_e$ (%) values. However, the laminated glass disclosed in Patent Document 3 has problems in outer appearance and problems in production steps.

The infrared reflection film disposed between the car exterior side glass plate and the fine particles-dispersed interlayer is poor in durability at its edge portion. Accordingly, to improve durability, a step (cut back) of cutting the film from the edge portion toward the center portion by about several cm has been required. The infrared reflection film is generally a hard film. A glass plate is bent in many cases since windows for vehicles particularly for automobiles are bent in many cases. Accordingly, when a laminated glass is produced using such a film, the film may not comply with the shape of the glass plate, thus impairing the outer appearance such as wrinkles in the film. Further, a step of providing a color layer (ceramic color layer) at the peripheral portion of the glass plate has been required so as to hide the wrinkles. Thus, a laminated glass including an infrared reflection film has problems in outer appearance and has problems such as complicated production steps.

Further, the present inventors have prepared a sample of a laminated glass using a film corresponding to the infrared reflection film used in Patent Document 3 and as a result, the sample was whitish and had significant haze. Further, a projected image reflected on the sample was remarkably distorted, and problems in sight are expected to use the sample as a windshield of an automobile.

Further, the infrared reflection film used in Patent Document 3 is a film having a coloring matter such as phthalocyanine incorporated in some cases. With an infrared film made of a resin, ringing may occur in a transmission spectrum, or a phenomenon such that the reflected colors differ depending upon the angle of incidence of solar light (dependence on the angle) may occur. A coloring matter is incorporated in the film so as to suppress such phenomenons. However, since a coloring matter such as phthalocyanine has absorption in the ultraviolet region, it will deteriorate by exposure to the solar light, whereby ringing in the reflection spectrum and the dependence of the reflected colors on the angle may become problematic.

The object of the present invention is to provide a laminated glass for a vehicle window, which suppresses absorption of the solar energy and which suppresses reradiation to the car interior side.

Means to Accomplish the Object

The present invention provides a laminated glass for a vehicle window, which comprises a first glass plate, a second glass plate having an infrared reflection film having a sheet resistance of at least 1 kΩ/□ (hereinafter sometimes referred to simply as an "infrared reflection glass plate"), and an interlayer having infrared shielding fine particles dispersed therein, interposed between the first glass plate and the second glass plate, the first glass plate being disposed on the car interior side, wherein with respect to light incident from the second glass plate side, the reflectance to light at all wavelengths of from 900 to 1,100 nm is from 30 to 50%, the absorptivity to light at all wavelengths of from 1,100 to 1,300 nm is from 35 to 60%, and the transmittance to light at all wavelengths of from 900 to 1,500 nm is at most 30%.

The present invention further provides a laminated glass for a vehicle window, which comprises a first glass plate, a second glass plate having an infrared reflection film having a sheet resistance of at least 1 kΩ/□, and an interlayer having infrared shielding fine particles dispersed therein, interposed between the first glass plate and the second glass plate, the first glass plate being disposed on the car interior side, wherein with respect to light incident from the second glass plate side, the reflectance to light at a wavelength of 900 nm is from 20 to 40%, the reflectance to light at all wavelengths of from 1,000 to 1,100 nm is from 30 to 50%, the absorptivity to light at all wavelengths of from 1,100 to 1,300 nm is from 35 to 60%, and the transmittance to light at all wavelengths of from 900 to 1,500 nm is at most 30%.

In order to suppress the increase in the car interior temperature, first, it is required to suppress transmission of the solar energy entering the car interior. Further, if the incident solar energy is absorbed in the laminated glass, the increase in the car interior temperature can not be suppressed due to reradiation of the absorbed solar energy, and accordingly it is preferred to make the solar energy not be absorbed in the laminated glass but be reflected as far as possible. Ideally, the infrared rays are reflected uniformly over a wide range of the infrared region, but such reflection is at a cost of radio wave transmission properties.

Accordingly in the present invention, the above vicious circle caused by a complicated tangle of factors such as radio wave transmission properties, reradiation of the solar energy and transmission of the solar energy is overcome from the following viewpoint. (1) To secure radio wave transmission properties, a reflection performance to light in a wavelength region to a certain extent is sacrificed. (2) A reflection performance to light in a wavelength region with a high energy is not sacrificed. (3) Light in the wavelength region sacrificed to secure the radio wave transmission properties is absorbed. Accordingly in the present invention, with respect to light incident from the second glass plate side, the reflectance to light at all wavelengths of from 900 to 1,100 nm is from 30 to 50%, the absorptivity to light at all wavelengths of from 1,100 to 1,300 nm is from 35 to 60%, and the transmittance to light at all wavelengths of from 900 to 1,500 nm is at most 30%.

When the laminated glass for a vehicle window has the above properties with respect to the light incident from the second glass plate side, a sufficient heat insulating function can be obtained. However, if the absorptivity to light at all wavelengths of from 1,100 to 1,300 nm is small, the solar transmittance tends to be high. Accordingly, to realize more favorable heat insulating performance, it is preferred that with respect to light incident from the second glass plate side, the reflectance to light at all wavelengths of from 900 to 1,100 nm is from 30 to 50%, the absorptivity to light at all wavelengths of from 1,100 to 1,300 nm is from 40 to 60%, and the transmittance to light at all wavelengths of from 900 to 1,500 nm is at most 30%.

Further, in order that an infrared sensor such as an optical beacon properly functions, it is required to suppress reflection to light at a wavelength of 850 nm to maintain a sufficient transmittance. Since the spectral properties such as a reflectance continuously change, the reflectance to light at a wavelength of 850 nm is affected by reflectances at wavelengths in the vicinity thereof. Accordingly, in order that an infrared sensor such as an optical beacon functions, the reflectance to light at a wavelength of 900 nm should be a small value to a certain extent. For this purpose, in the present invention, the reflectance to light at a wavelength of 900 nm is from 20 to 40%. In addition, to secure heat insulating performance also, the reflectance to light at all wavelengths of from 1,000 to 1,100 nm is from 30 to 50%, the absorptivity to light at all wavelengths of from 1,100 to 1,300 nm is from 35 to 60%, and the transmittance to light at all wavelengths of from 900 to 1,500 nm is at most 30%. In this embodiment, the reflectance to light in a region exceeding 900 nm and less than 1,000 nm continuously changes between the reflectance to light at a wavelength of 900 nm and the reflectance to light at a wavelength of 1,000. In this embodiment also, the absorptivity to light at all wavelengths of from 1,100 to 1,300 nm is preferably from 40 to 60%.

Optical characteristics of the laminated glass of the present invention are optical characteristics with respect to light incident from the second glass plate side. Thus, hereinafter the description "with respect to light incident from the second glass plate side" is omitted. Further, in the present invention, the "infrared reflection film having a sheet resistance of at least 1 k$\Omega$/☐" means that the radio wave transmission properties are sufficiently secured. Accordingly, the upper limit of the sheet resistance is not particularly limited so long as the material allows. Further, the after-mentioned oxide material for the infrared reflection film has, when heat treated after formed into the film, a higher resistance than the resistance before heat treatment since oxidation of the film material proceeds. Whereas, the required radio wave transmission properties are necessary for a laminated glass to be finally used for a vehicle window, and accordingly a resistance of the infrared reflection film provided on the second glass plate of at least 1 k$\Omega$/☐ after heat treatment e.g. to prepare a laminated glass is sufficient.

In such a laminated glass, an absorptivity to light at all wavelengths of from 900 to 1,100 nm of from 30 to 50% is preferred since absorption of light particularly in a wavelength region with a high energy is suppressed, and the solar energy to be reradiated can be reduced. Further, in such a laminated glass, a reflectance to light at all wavelengths of from 1,100 to 1,300 nm of from 20 to 40% is preferred, whereby the solar energy can more securely be reflected.

To securely obtain such a laminated glass, the infrared reflection film preferably has a stacked coating film having a high refractive index layer/a low refractive index layer/a high refractive index layer stacked in this order.

It is preferred that the infrared reflection film comprises a stacked coating film (X) having a coating film (1) made of a high refractive index inorganic material having a refractive index of at least 1.90 and a coating film (2) made of a low refractive index inorganic material having a refractive index of at most 1.56 alternately stacked in this order from the glass plate side, the total number of the coating film (1) and the coating film (2) is at least 3, the geometrical thickness of the coating film (1) is from 70 to 150 nm, and the geometrical thickness of the coating film (2) is from 100 to 200 nm.

Further, in order that the laminated glass of the present invention can be used also for a windshield of an automobile, it preferably has a visible light transmittance of at least 70%.

In the present invention, the absorptivity is represented by the formula: absorptivity=1−(reflectance+transmittance). Strictly, light entering the laminated glass is "reflected", "absorbed", "transmitted" and in addition, "scattered". However, in the case of glass articles, the loss due to "scattering" is very small, and accordingly it is reasonable to represent the absorptivity by {1−(reflectance+transmittance)}.

EFFECTS OF THE INVENTION

According to the present invention, a laminated glass for a vehicle window which suppresses transmission of the solar energy entering the car interior and which suppresses an increase in the car interior temperature, by making the solar energy not be excessively absorbed in the laminated glass but be reflected as far as possible, is provided. Specifically, by making the reflectance to light at all wavelengths of from 900 to 1,100 nm be from 30 to 50%, the absorptivity to light at all wavelengths of from 1,100 to 1,300 nm be from 35 to 60% and the transmittance to light at all wavelengths of from 900 to 1,500 nm be at most 30%, the solar energy can be reflected while securing the radio wave transmission properties, whereby the solar energy absorbed in the laminated glass can be reduced, and reradiation of the absorbed solar energy can be suppressed, thus preventing the increase in the car interior temperature.

MEANINGS OF SYMBOLS

Figure 1:
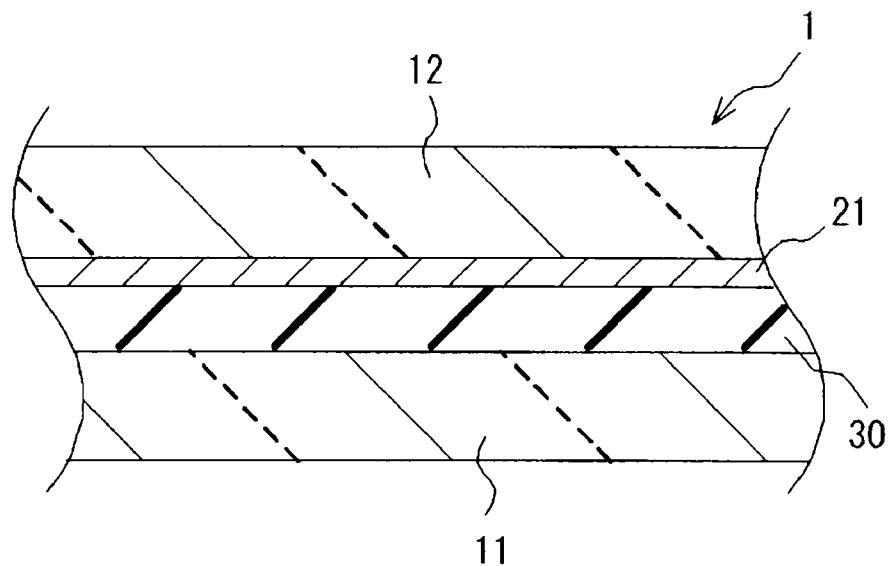
FIG. 1 is a cross section schematically illustrating one example of the laminated glass for a vehicle window of the present invention.

1: Laminated glass
11: First glass plate
12: Second glass plate
20: Infrared reflection glass plate
21: Infrared reflection film
30: Interlayer

BEST MODE FOR CARRYING OUT THE INVENTION

In the description of the present invention, the infrared rays are electromagnetic waves having a wavelength longer than that of visible light and at most 2,000 nm, unless otherwise specified. Particularly the infrared reflection film in the present invention is to reflect infrared rays mainly at wavelengths of from 800 to 1,600 nm. The infrared rays in this wavelength region are sometimes called near infrared rays.

Regarding the laminated glass for a vehicle window of the present invention, with respect to light incident from the car exterior side, the reflectance to light at all wavelengths of from 900 to 1,100 nm is from 30 to 50%, the absorptivity to light at all wavelengths of from 1,100 to 1,300 is from 35 to 60%, and the transmittance to light at all wavelengths of from 900 to 1,500 nm is at most 30%, whereby the solar energy can efficiently be reflected while securing radio wave transmission properties, whereby the transmittance to solar energy can be reduced. Accordingly, the solar energy absorbed in the laminated glass can be reduced, and reradiation of the absorbed solar energy can be suppressed, thus preventing the increase in the car interior temperature.

Further, regarding the laminated glass for a vehicle window of the present invention, with respect to light incident from the car exterior side, the reflectance to light at a wavelength of 900 nm is from 20 to 40%, the reflectance to light at all wavelengths of from 1,000 to 1,100 is from 30 to 50%, the absorptivity to light at all wavelengths of from 1,100 to 1,300 nm is from 35 to 60%, and the transmittance to light at all wavelengths of from 900 to 1,500 nm is at most 30%, whereby the solar energy can efficiently be reflected while securing the radio wave transmission properties, while an infrared sensor such as an optical beacon properly functions, and accordingly the transmittance to solar energy can be reduced.

The following structures may be mentioned as a structure of a laminated glass for a vehicle window having such properties.

(A) Car exterior side glass plate/infrared reflection film/infrared shielding fine particles-containing interlayer/car interior side glass plate;

(B) Car exterior side glass plate/interlayer/resin film/infrared reflection film/infrared shielding fine particles-containing interlayer/car interior side glass plate.

In the laminated glass for a vehicle window having such a structure, the infrared reflection film suppresses reflection to light in a certain wavelength region and efficiently reflects light in a wavelength region with a high energy, so as to secure radio wave transmission properties. Further, the infrared shielding fine particles-containing interlayer plays a role to absorb light in the wavelength region sacrificed to secure the radio wave transmission properties. Namely, by such a combination, favorable heat insulating performance is obtained. In the structure (B), the interlayer disposed between the car exterior side glass plate and the resin film is preferably a usual interlayer containing no infrared shielding fine particles. The interlayer in the present invention plays a role to absorb infrared rays in a region to which the reflection is suppressed by the infrared reflection film. If the infrared shielding fine particles-containing interlayer is present before the infrared reflection film (if light enters the infrared shielding fine particles-containing interlayer, not the infrared reflection film), light is mainly absorbed in the interlayer and consequently, reradiation of the solar energy to the car interior occurs, whereby no desired the insulating performance will be obtained.

The infrared reflection film in the laminated glass for a vehicle window is a stacked coating film having a coating film made of a high refractive index inorganic material and a low refractive index inorganic material stacked in this order from the glass side and is an infrared reflection film which reflects infrared rays by interference action. In order that the infrared rays are reflected by the interference action, the optical thickness of each layer is an integral multiple of $\lambda/4$ ($\lambda$ is the wavelength of the infrared ray).

The laminated glass for a vehicle window may be a laminated glass having either of the structures (A) and (B), preferably a laminated glass for a vehicle window having the structure (A). The film on which the infrared reflection film is laminated is a hard film of e.g. PET or PEN. Accordingly, when the film provided with the infrared reflection film is sandwiched between two glass plates to prepare a laminated glass, it may not comply with the bent shape of the laminated glass, thus impairing the outer appearance such as formation of wrinkles. Further, if the film provided with the infrared reflection film reaches the edge portion of the glass plate, the edge portion is poor in durability. Accordingly, to improve the durability, a step of cutting the film from the edge portion toward the center portion by several cm may be required, or a step of providing a color layer (ceramic color layer) at the peripheral portion of the glass plate to hide wrinkles may be required.

Further, the film provided with an infrared reflection film has a problem of poor production efficiency. A sputtering method is preferably employed as a method of laminating the infrared reflection film on the glass plate or the resin film. In the case of film deposition by a sputtering method, film deposition at a high power is required to increase the film deposition efficiency. However, if the substrate is a resin film, no sufficient power can be applied due to restrictions from the upper temperature limit of the resin, whereby the film deposition efficiency may decrease.

Now, the present invention will be described mainly with reference to the laminated glass for a vehicle window having the structure (A).

The present invention will be described in further detail with reference to the drawings. FIG. 1 is a cross section schematically illustrating one example of the laminated glass for a vehicle window of the present invention. The laminated glass 1 in this drawing basically comprises two glass plates 11 and 12 and an interlayer 30. The first glass plate 11 and the second glass plate 12 are laminated by means of the interlayer 30. The second glass plate 12 is disposed on the car exterior side when the laminated glass 1 is assembled in a vehicle. The second glass plate 12 has an infrared reflection film 21 on the interlayer 30 side. The interlayer 30 is an infrared shielding interlayer having infrared shielding fine particles dispersed therein.

Figure 2:
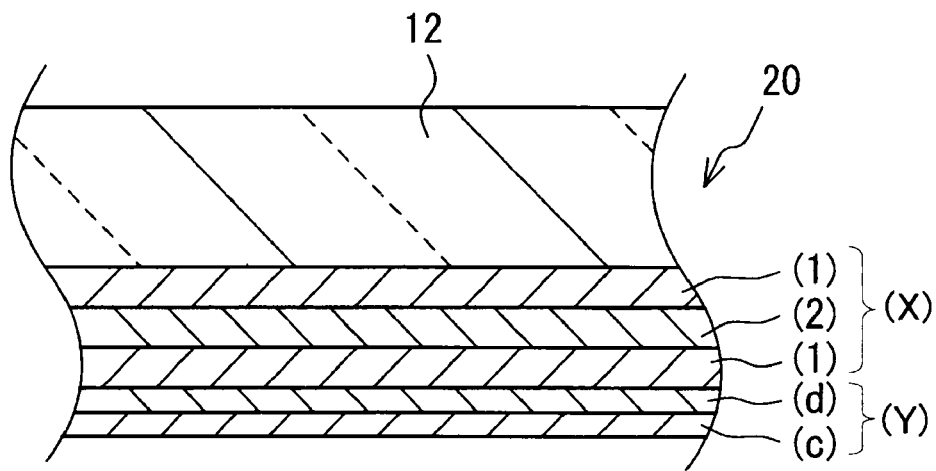
FIG. 2 is a cross section schematically illustrating one example of the second glass plate having an infrared reflection film in the present invention.

FIG. 2 is a cross section schematically illustrating one example of the second glass plate having an infrared reflection film in the present invention. The second glass plate having an infrared reflection film in this drawing comprises a glass plate 12 and an infrared reflection film 21 provided on the glass plate 12. The infrared reflection film 21 comprises a stacked coating film (X) comprising three coating films in total of a coating film (1), a coating film (2) and a coating film (1) in this order from the glass plate 12 side. In this embodiment, a thin film (Y) is laminated on the non-glass side surface of the stacked coating film (X). The thin film (Y) consists of two layers of a high refractive index layer (c) and a low refractive index layer (d), and the low refractive index layer (d) is in contact with the coating film (1) of the stacked coating film (X).

Of the laminated glass (1) having such a structure, the reflectance to light at all wavelengths of from 900 to 1,100 nm is from 30 to 50%, the absorptivity to light at all wavelengths of from 1,100 to 1,300 nm is from 35 to 60%, and the transmittance to light at all wavelengths of from 900 to 1,500 nm is at most 30%. Further, in order that an infrared sensor such as an optical beacon properly functions, by the above structure, it is possible that the reflectance to light at a wavelength of 900 nm is from 20 to 40%, the reflectance to light at all wavelengths of from 1,000 to 1,100 is from 30 to 50%, the absorptivity of light at all wavelengths of from 1,100 to 1,300 nm is from 35 to 60%, and the transmittance to light at all wavelengths of from 900 to 1,500 nm is at most 30%.

For the first and second glass plates in the present invention, usually soda lime silica glass can be used. In such a case, it may be any of transparent and colorless glass, colored transparent glass and deep color glass. Particularly, it is preferred to use transparent and colorless glass for the second glass plate on which the infrared reflection film is provided or to use green transparent glass or deep color glass for the first glass plate, and it is more preferred to use transparent and colorless glass for the second glass plate on which the infrared reflection film is provided and to use green transparent glass or deep color glass for the first glass plate. In such a case, the green transparent glass more preferably has ultraviolet absorption performance and infrared absorption performance, whereby when the second glass plate is disposed on the car exterior side, the solar energy can be reflected on the car exterior side as far as possible, and in addition, the solar transmittance of the laminated glass can be reduced.

The green transparent glass may, for example, be soda lime silica glass containing iron. That is, it is soda lime silica glass comprising soda lime silica type mother glass and for example from 0.3 to 1% of total iron as calculated as $Fe_2O_3$ represented by mass percentage incorporated. Further, as the absorption of light at a wavelength in the near infrared region, absorption by bivalent iron among total iron is dominant. Accordingly, the mass of FeO (bivalent iron) as calculated as $Fe_2O_3$ is more preferably from 20 to 40% of the mass of total iron as calculated as $Fe_2O_3$. To impart ultraviolet absorption performance, addition of cerium to the soda lime silica type mother glass may, for example be mentioned. Specifically, preferred is use of soda lime silica glass substantially having the following composition represented by mass percentage.

$SiO_2$: 65 to 75%, $Al_2O_3$: 0.1 to 5%, $Na_2O+K_2O$: 10 to 18%, CaO: 5 to 15%, MgO: 1 to 6%, total iron as calculated as $Fe_2O_3$: 0.3 to 1%, total cerium as calculated as $CeO_2$ and/or $TiO_2$: 0.5 to 2%.

The deep color glass is not particularly limited and it may, for example, be suitably soda lime silica glass containing iron at a high concentration.

Figure 3:
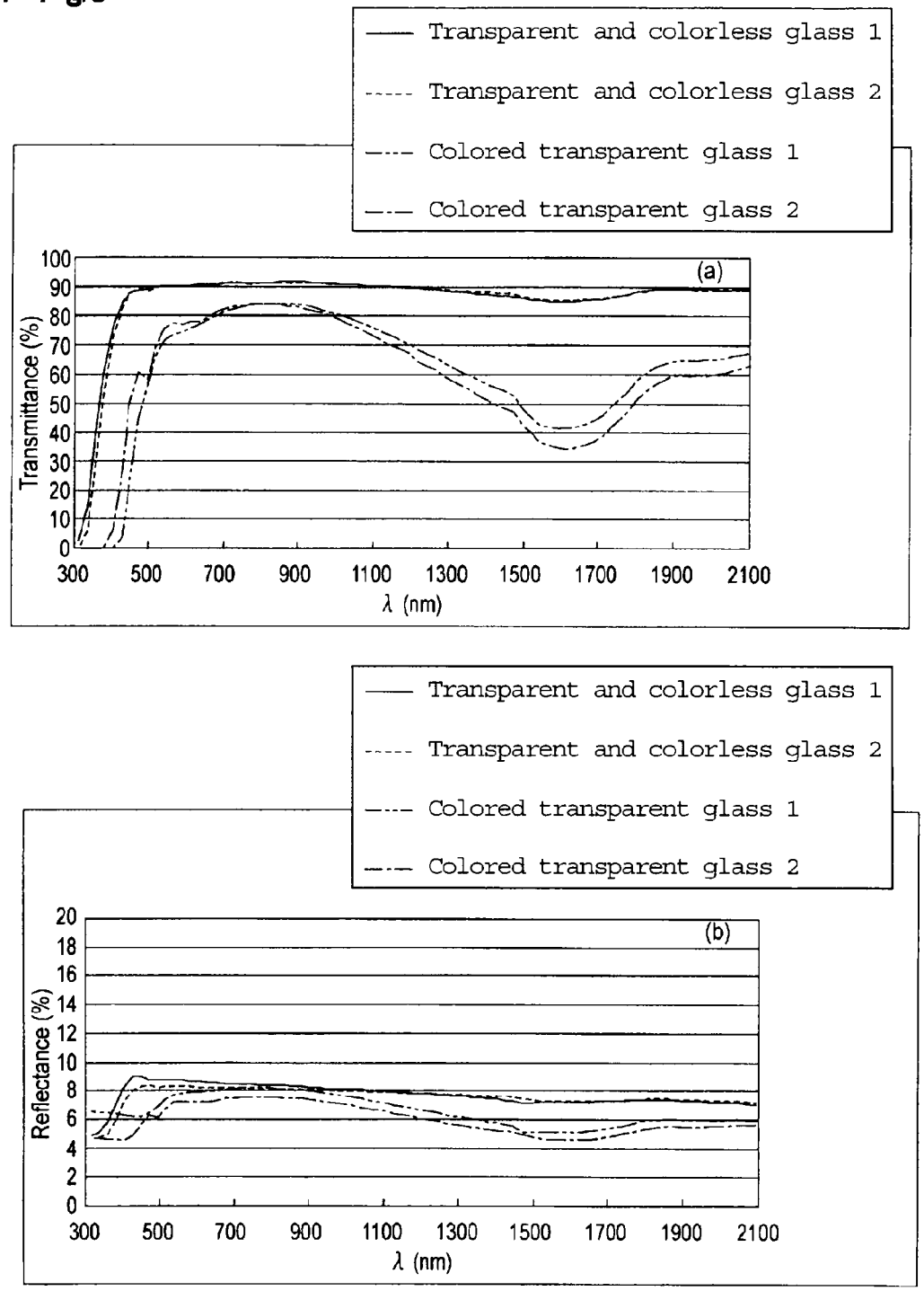
FIG. 3 is a graph (a) illustrating spectral transmittances and a graph (b) illustrating spectral reflectances of glass plates in the present invention.

FIG. 3(*a*) illustrates spectral transmittances of glass plates used in the present invention, and FIG. 3(*b*) illustrates spectral reflectances of glass plates used in the present invention. It is shown that the colored transparent glass plate has a low transmittance to light as compared with a transparent and colorless glass plate.

For use of the laminated glass for a vehicle window, each of the thicknesses of the first and the second glass plates is preferably from 1.5 to 3.0 mm. In such a case, the first and the second glass plates may have the same thickness or different thicknesses. For use of the laminated glass for an automobile window, for example, both the first and the second glass plates have a thickness of 2.0 mm or a thickness of 2.1 mm. Further, for use of the laminated glass for an automobile window, for example, the thickness of the first glass plate is less than 2 mm and the thickness of the second glass plate is slightly thicker than 2 mm, whereby the total thickness of the laminated glass can be reduced and the laminated glass is resistant to external force from the car exterior side as well. Each of the first and the second glass plates may be flat or bent. The first and the second glass plates are bent in many cases since vehicle particularly automobile windows are bent in many cases. In such a case, the infrared reflection film is provided on the concave side of the second glass plate. Further, as the case requires, three or more glass plates may be used.

The interlayer in the present invention is an interlayer having infrared shielding fine particles dispersed therein. As a material of the interlayer, usually a polyvinyl butyral is used. In addition, an ethylene/vinyl acetate copolymer may, for example, be mentioned. Infrared shielding fine particles are dispersed in such a material for the interlayer to prepare a film, to obtain an interlayer having the infrared shielding fine particles dispersed therein. The infrared shielding fine particles preferably have a particle size of at most 0.2 μm, more preferably from 0.001 to 0.15 μm. Further, the ratio of the infrared shielding fine particles dispersed is preferably from 0.1 to 1 part by mass, particularly preferably from 0.1 to 0.5 part by mass, especially preferably from 0.2 to 0.3 part by mass per 100 parts by mass of the total mass of the interlayer.

By the above, desired infrared shielding function of the present invention can effectively be obtained and in addition, the haze caused by incorporation of the fine particles can be reduced.

The infrared shielding fine particles may, for example, be fine particles of a metal such as Sn, Ti, Si, Zn, Zr, Fe, Al, Cr, Co, Ce, In, Ni, Ag, Cu, Pt, Mn, Ta, W, V or Mo, an oxide, a nitride, a sulfide or such a material doped with Sb or F. Among these materials, it is preferred to use at least one member selected from the group consisting of antimony-doped tin oxide (ATO) fine particles, ITO fine particles and zinc oxide fine particles, since ATO, ITO and zinc oxide fine particles are excellent in infrared shielding performance, and accordingly the amount blended in the interlayer can be reduced. Among them, it is particularly preferred to use ITO fine particles as the infrared shielding fine particles, which are excellent in infrared shielding performance.

Such an interlayer can be obtained, for example, by the following production process. Namely, first, the infrared shielding fine particles are dispersed in a plasticizer for the interlayer. Then, the plasticizer having the infrared shielding fine particles dispersed therein is dispersively added to a resin solution for the interlayer, followed by mixing and kneading to obtain a resin material for the film. Then, the resin material for the film is formed into a film e.g. by extrusion, to obtain an interlayer having infrared shielding fine particles dispersed therein. When the plasticizer is dispersively added, various additives may be added to the resin solution for the interlayer. The additives may, for example, be various pigments, an organic ultraviolet absorber and an organic infrared absorber. Further, the plasticizer and a solvent for the resin solution for the interlayer may be known ones.

The interlayer obtained as described above preferably has a thickness of from about 0.5 to about 1 mm, usually 0.76 mm.

A process for producing the laminated glass for a vehicle window of the present invention is not particularly limited and it may, for example, be a process of sandwiching the interlayer between the infrared reflection film on the second glass plate having the infrared reflection film and the first glass plate, followed by pressing for unification.

The laminated glass for a vehicle window of the present invention has a visible light transmittance of preferably at least 70%, particularly preferably at least 75%, so that it can be used also for a windshield of an automobile.

Now, the second glass plate having an infrared reflection film of the present invention (hereinafter sometimes referred to simply as an "infrared reflection glass plate") will be described.

The glass plate as a substrate of the infrared reflection glass plate of the present invention may be a flat glass plate or may be a processed glass plate. In the present invention, the processed glass plate means a formed glass plate obtained by forming a flat glass plate or a tempered glass plate obtained by heat tempering, and it may be a glass plate obtained by heat tempering simultaneously with forming. The processed glass plate is obtained usually by thermal processing of a flat glass plate. The thermal processing may, for example, be bending a flat glass plate with heating or quenching a high temperature glass plate which is bent for tempering. The infrared reflection film is usually present on one side of such a glass plate. A bent glass plate having an infrared reflection film is obtained by a method of forming an infrared reflection film on one side of a bent glass plate, a method of bending a flat glass plate having an infrared reflection film, or the like. In the present invention, preferred is one obtained by the latter method, and one of the objects of the present invention is to provide a flat glass plate provided with an infrared reflection film adaptable for this method.

In the present invention, heat treatment means heating in the above thermal processing but is not limited thereto, and means heating the glass plate at 400° C. or above, preferably from 500 to 700° C. for a certain purpose. The upper limit of the heat treatment temperature is a temperature at which glass of the glass plate melts. Further, an infrared reflection glass plate to be subjected to thermal processing, before subjected to thermal processing, will hereinafter sometimes be referred to as a precursor. In the present invention, a single plate means one glass plate, and sometimes means one glass plate having an infrared reflection film.

The infrared reflection glass plate of the present invention is useful as a window material for a vehicle such as an automobile. The window material for a vehicle may be a laminated glass such as a windshield or may be a single plate such as door glass. Such a window material is usually a glass plate to which thermal processing (bending, tempering, etc.) is applied. That is, it is a glass plate produced by bending a glass plate depending upon the shape of the laminated glass, or by tempering a laminated glass or a single plate glass to improve strength. An infrared reflection glass plate which is not bent (which may be tempered) is suitable as a window material for a building.

The infrared reflection film in the present invention is preferably a stacked coating film having a coating film made of a high refractive index inorganic material and a low refractive index inorganic material stacked in this order from the glass side and is preferably an infrared reflection film which reflects infrared rays by the interference action which the stacked coating film has. The reason is to securely make the reflectance to light at all wavelengths of from 900 to 1,100 nm be from 30 to 50%, the absorptivity to light at all wavelengths of from 1,100 to 1,300 nm be from 35 to 60%, and the transmittance to light at all wavelengths of from 900 to 1,500 nm be at most 30% in the laminated glass while maintaining radio wave transmission properties.

The infrared reflection glass plate is preferably an infrared reflection glass plate having a stacked coating film (X) having a coating film (1) made of a high refractive index inorganic material having a refractive index of at least 1.90 and a coating film (2) made of a low refractive index inorganic material having a refractive index of at most 1.56 alternately stacked in this order from the glass side, the total number of the coating film (1) and the coating film (2) being at least 3, the geometrical thickness of the coating film (1) being from 70 to 150 nm, and the geometrical thickness of the coating film (2) being from 100 to 200 nm.

In the present invention, a high refractive index inorganic material is an inorganic material having a refractive index higher than the refractive index of the glass plate. The refractive index is preferably at least 1.90, more preferably from 1.90 to 2.60, particularly preferably from 2.00 to 2.55 (the refractive index is a value at a wavelength of 550 nm, the same applies hereinafter). In a case where the coating film (1) is a multilayer coating film as described hereinafter, the refractive index of a material of the main layer (the layer having the greatest geometrical thickness) in the multilayer coating film is preferably from 2.35 to 2.55. Further, the low refractive index inorganic material in the present invention is an inorganic material having a refractive index lower than that of the high refractive index inorganic material. The refractive index is preferably at most 1.56, more preferably from 1.40 to 1.56, particularly preferably from 1.45 to 1.50.

The difference in the refractive index between the coating film (1) as the high refractive index coating film and the coating film (2) as the low refractive index coating film is preferably at least 0.5, particularly preferably at least 0.8. As described hereinafter, when at least one of these coating films is a multilayer coating film, the refractive index difference between a material of a part of layers in the multilayer coating film and a material of other layer (in a case where other layer is a multilayer coating film, a material of a part of layers) is not limited thereto. However, even in such a case, the refractive index difference between the material of the main layer in the multilayer coating film and a material of other layer (in a case where other layer is a multilayer coating film, the material of the main layer) is preferably at least 0.5. The refractive index difference between the coating films (1) and (2) is usually preferably large, but the upper limit of the refractive index difference is usually about 1.5 (particularly about 1.2) due to restrictions from materials.

In order that infrared rays are reflected by interference action of the stacked coating film (X) having the coating film (1) and the coating film (2) alternately stacked, each of the optical thicknesses of the coating films (1) and (2) is required to be an integral multiple of $\lambda/4$, where $\lambda$ is the wavelength of the infrared ray. Accordingly, in order that infrared rays at from 800 to 1,600 nm are reflected, the optical thickness of the coating film is required to be from 200 to 400 nm. Accordingly, considering the refractive index of the material of each coating film, the geometrical thickness of the coating film having a refractive index of from 1.90 to 2.60 is from 77 to 211 nm, and the geometrical thickness of the coating film having a refractive index of from 1.40 to 1.56 is from 128 to 286 nm.

Each of the optical thicknesses of the coating films (1) and (2) in the present invention is preferably from 180 to 400 nm, particularly preferably from 190 to 350 nm considering that there may be reflection on the long wavelength side in the visible region to a certain extent. Accordingly, in the present invention, the geometrical thickness of the coating film (1) is from 69 to 211 nm, and the geometrical thickness of the coating film (2) is from 115 to 286 nm. However, if the geometrical thickness is great, not only formation of a homogeneous coating film is difficult (film deposition properties are low) and the productivity is low, but also defects such as cracks may occur. Particularly, the material of the coating film (1) particularly titanium oxide has significant heat shrink properties, whereby cracks are likely to occur at the time of heat treatment. Accordingly, the geometrical thicknesses of the coating films (1) and (2) in the present invention are required to be a certain thickness or below. Accordingly, the geometrical thickness of the coating film (1) in the present invention is from 70 to 150 nm, and the geometrical thickness of the coating film (2) in the present invention is from 100 to 200 nm. Considering the above theoretical values, the geometrical thickness of the coating film (1) is more preferably from 80 to 150 nm, and the geometrical thickness of the coating film (2) is more preferably from 130 to 200 nm.

The high refractive index inorganic material is preferably titanium oxide, zinc oxide, tantalum oxide, zirconium oxide, niobium oxide, tin oxide, titanium nitride, silicon nitride, zirconium nitride, aluminum nitride, titanium oxynitride, zirconium oxynitride, tin oxynitride or the like. The low refractive index inorganic material is suitably silicon oxide, magnesium fluoride, a composite oxide of silicon oxide with another material (e.g. Al, F, C, B or P). Among them, preferred is silicon oxide or a composite oxide of silicon oxide with Al, particularly preferred is silicon oxide. Further, considering the radio wave transmission properties, the electrical conductivity of such materials is preferably low. Accordingly, the high refractive index inorganic material is preferably titanium oxide, zirconium oxide or titanium oxynitride, and the low refractive index inorganic material is preferably silicon oxide.

In the infrared reflection glass plate of the present invention, since the total number of the coating film (1) and the coating film (2) is at least 3, at least two coating films (1) are present. They may be coating films made of the same material or may be coating films made of different materials. The same applies to the coating film (2). When two or more coating films (2) are present in the infrared reflection film, they may be coating films made of the same material or may be coating films made of different materials.

Further, regarding one coating film (1), the coating film (1) may be a single layer film made of a single high refractive index inorganic material or may be a high refractive index multilayer film (1b) having a multilayer structure consisting of at least two layers made of different high refractive index inorganic materials. It is preferred that at least one coating film (1) is a high refractive index multilayer film (1b). Further, it is particularly preferred that the high refractive index multilayer film (1b) has a two layer structure.

In a case where the coating film (1) is a single layer film, it is preferably a single layer film (1a) of titanium oxide or titanium oxynitride. Titanium oxide has such an advantage that the geometrical thickness of the film can be reduced, since it is transparent and has a particularly high refractive index among high refractive index inorganic materials. Titanium oxynitride is also advantageous since it has a high refractive index. Further, as described hereinafter, by use of titanium oxynitride, such an advantage can be obtained that cracks on the film can be suppressed at the time of heat treatment in e.g. bending or tempering. Here, the single layer film of a titanium oxynitride layer is a film consisting of only a titanium oxynitride ($TiO_xN_y$) layer. Hereinafter titanium oxide and titanium oxynitride will generically be referred to as a "titanium compound".

The high refractive index multilayer film (1b) is preferably such that at least one layer constituting the multilayer film (1b) is a layer of a titanium compound. A layer other than the layer of titanium compound may, for example, be a layer of zirconium oxide, a layer of tin oxide, a layer of tantalum oxide, a layer of zinc oxide, a layer of niobium oxide, a layer of titanium nitride, a layer of silicon nitride, a layer of zirconium nitride, a layer of aluminum nitride, a layer of zirconium oxynitride or a layer of tin oxynitride, and it is preferably a layer of zirconium oxide. In a case where a coating film (1) is the high refractive index multilayer film (1b), the optical thickness of the entire multilayer film (the sum of optical thicknesses of the respective layers) should be an integral multiple of λ/4, and the geometrical thickness should be from 70 to 150 nm as the total thickness of the multilayer film.

The high refractive index multilayer film (1b) is preferably a high refractive index multilayer film (1b-1) comprising a layer of zirconium oxide and a layer of a titanium compound. The order of stacking of the layer of zirconium oxide and a layer of a titanium compound is not particularly limited, and a case where the layer of zirconium oxide and the layer of a titanium compound are stacked in this order from the glass plate side, and a case where the layer of a titanium compound and the layer of zirconium oxide are stacked in this order from the glass plate side, may be mentioned, and the former is preferred. Further, a three layer structure of two layers of zirconium oxide and a layer of a titanium compound present therebetween may also be employed.

It is preferred to use, as the coating film (1), a single layer film of titanium oxynitride or a high refractive index multilayer film (1b-1) comprising the layer of zirconium oxide and the layer of a titanium compound as mentioned above, from the following reasons.

The infrared reflection glass plate of the present invention can be produced by applying heat treatment such as bending or tempering to a precursor (described hereinafter) of the infrared reflection glass. Cracks may occur on the infrared reflection film by heat treatment at the time of bending or tempering depending upon the material of the coating film. Particularly when the geometrical thickness of the entire infrared reflection film is great (e.g. 300 nm or more), cracks are likely to occur.

Cracks are considered to be caused mainly by volume shrinkage of the film by crystallization at the time of heat treatment. Accordingly, cracks can be suppressed by a means of using a coating film made of a material having a high crystallization temperature, using a multilayer film having different materials stacked to suppress the volume shrinkage, or the like. Titanium oxynitride is less likely to undergo crystallization at the time of heat treatment as compared with titanium oxide. Accordingly, cracks can be suppressed by using titanium oxynitride as the constituting material of the coating film (1).

Further, to suppress cracks, it is also effective to make the coating film (1) be the multilayer film (1b), and it is particularly preferred to make it be the multilayer film (1b-1) comprising a layer of zirconium oxide and a layer of a titanium compound.

Most of the zirconium oxide layer is formed into a monoclinic system at the time of film deposition. Further, the zirconium oxide layer has a size of the crystal lattice about the same level as that of the titanium oxide layer, whereby lattice matching is likely to occur. It is considered that shrinkage is less likely to occur at the time of heat treatment (i.e. crystallization is less likely to occur) since rearrangement of the lattice in the interior of the titanium oxide layer at the time of heat treatment which leads to crystallization, is suppressed by such an adjacent zirconium oxide layer. Accordingly, by stacking a zirconium oxide layer and a titanium oxide layer, cracks can be suppressed. Further, by a multilayer film of a layer of zirconium oxide and a layer of titanium oxynitride, both effects can be obtained, such being more favorable.

In a case where the high refractive index multilayer film (1b) is a high refractive index multilayer comprising a layer of zirconium oxide and a layer of a titanium compound, in order to obtain the effect of suppressing cracks by the zirconium oxide layer, the geometrical thickness of the zirconium oxide layer is preferably from 5 to 35 nm, more preferably from 10 to 25 nm. The optical thickness of the zirconium oxide layer (refractive index: 2.06) having a geometrical thickness of from 5 to 35 nm is from 10 to 70 nm, which corresponds to a geometrical thickness of the layer of a titanium compound (refractive index is considered to be from 2.4 to 2.48) of from 4 to 29 nm. Accordingly, the layer of a titanium compound in the high refractive index multilayer film (1b) having a zirconium oxide layer of from 5 to 35 nm is preferably a layer thinner by from 4 to 29 nm than the geometrical thickness of a titanium compound single film having no layer of zirconium oxide.

With respect to the coating film (2) also, regarding one coating film (2), the coating film (2) may be a single layer film made of a single low refractive index inorganic material or may be a low refractive index multilayer film having a multilayer structure of at least two layers made of different low refractive index inorganic materials. In the case of the coating film (2), it is preferably a single layer film made of a single low refractive index inorganic material, particularly preferably a single layer film made of silicon oxide.

The infrared reflection glass plate of the present invention comprises the glass plate and the stacked coating film (X) having the coating film (1) made of the above high refractive index inorganic material and the coating film (2) made of the above low refractive index inorganic material alternately stacked in this order from the glass plate side, and the total number of the coating film (1) and the coating film (2) is at least 3. The total number is not particularly limited so long as it is at least 3, but if it is too large, the total thickness tends to be great, whereby cracks are likely to occur or the productivity tends to deteriorate. Accordingly, the upper limit is preferably 9, particularly preferably 7.

The total number of the coating film (1) and the coating film (2) may be an odd number or an even number, and can be determined depending upon the situation in which the infrared reflection glass plate is used. For example, when the infrared reflection glass plate is disposed to be the car exterior side glass so that the surface of the stacked coating film (X) is in contact with the interlayer to prepare a laminated glass, the coating film constituting the stacked coating film (X) farthest from the glass plate is preferably the coating film (1) made of a high refractive index inorganic material. In such a case, the total number is preferably an odd number, specifically preferably 3, 5 or 7, preferably 3 or 5, particularly preferably 3.

On the other hand, in a case where the infrared reflection glass plate of the present invention is used by itself (as a single plate), the coating film farthest from the glass plate is preferably the coating film (2) made of a low refractive index inorganic material. Accordingly, the total number is preferably an even number, specifically preferably 4 or 6.

The coating films (1) and (2) present in the infrared reflection film preferably have substantially the same optical thickness. If there is a dispersion of the optical thickness, the reflected colors may be uneven, or the visible light transmittance tends to be low. The variation of the optical thickness of two or more coating films (1) in the infrared reflection film is preferably within a range of ±50 nm, and the variation of the geometrical thickness is preferably within a range of ±20 nm considering the refractive index of the high refractive index inorganic material constituting the coating film (1). Further, considering the refractive index of the high refractive index inorganic material and the refractive index of the low refractive index inorganic material, the ratio of the geometrical thickness of the coating film (1) to the geometrical thickness of the coating film (2) is preferably ½ to ¾ by the coating film (1)/the coating film (2).

The stacked coating film (X) preferably has a three layer structure consisting of two coating films (1) and a coating film (2) present between the two coating films (1). In a case where the coating film (1) is a single layer film (1a) of titanium oxide (oxynitride), it has a three layer structure of (1a)/(2)/(1a) from the glass plate side. At least one coating film (1) is more preferably the high refractive index multilayer film (1b), and in such a case, it has a three layer structure of (1b)/(2)/(1a), (1a)/(2)/(1b), or (1b)/(2)/(1b) from the glass plate side. Among them, the three layer structure of (1b)/(2)/(1b) is preferred. The high refractive index multilayer film (1b) is preferably the above high refractive index multilayer film (1b-1). Accordingly, the most preferred stacked coating film (X) in the present invention is a stacked coating film having a three layer structure consisting of two high refractive index multilayer films (1b-1) and a coating film (2) present between the two high refractive index multilayer films (1b-1).

Further, the geometrical thickness (total thickness) of the entire stacked coating film (X) is preferably from 240 to 650 nm, particularly preferably from 300 to 500 nm from the viewpoint of favorable durability.

The following structures may, for example, be mentioned as the structure of the stacked coating film (X). In the following structures, G represents a glass plate.

[1] G/coating film (1)/coating film (2)/coating film (1),
[2] G/coating film (1)/coating film (2)/coating film (1)/coating film (2),
[3] G/coating film (1)/coating film (2)/coating film (1)/coating film (2)/coating film (1),
[4] G/coating film (1)/coating film (2)/coating film (1)/coating film (2)/coating film (1)/coating film (2), and
[5] G/coating film (1)/coating film (2)/coating film (1)/coating film (2)/coating film (1)/coating film (2)/coating film (1)

More specifically, stacked coating films (X) having the following structures may, for example, be mentioned.

[1-1]: $G/TiO_2/SiO_2/TiO_2$,
[1-2]: $G/TiO_xN_y/SiO_2/TiO_2$,
[1-3]: $G/TiO_2/SiO_2/TiO_xN_y$,
[1-4]: $G/TiO_xN_y/SiO_2/TiO_xN_y$,
[1-5]: $G/ZrO_2/TiO_2/SiO_2/TiO_2$,
[1-6]: $G/ZrO_2/TiO_2/SiO_2/ZrO_2/TiO_2$,
[1-7]: $G/ZrO_2/TiO_2/SiO_2/TiO_xN_y$,
[1-8]: $G/ZrO_2/TiO_2/SiO_2/ZrO_2/TiO_xN_y$,
[1-9]: $G/ZrO_2/TiO_xN_y/SiO_2/TiO_2$,
[1-10]: $G/ZrO_2/TiO_xN_y/SiO_2/ZrO_2/TiO_2$,
[1-11]: $G/ZrO_2/TiO_xN_y/SiO_2/TiO_xN_y$,
[1-12]: $G/ZrO_2/TiO_xN_y/SiO_2/ZrO_2/TiO_xN_y$,
[1-13]: $G/TiO_xN_y/SiO_2/ZrO_2/TiO_2$,
[1-14]: $G/TiO_xN_y/SiO_2/ZrO_2/TiO_xN_y$,
[1-15]: $G/TiO_xN_y/ZrO_2/SiO_2/TiO_xN_y$,
[1-16]: $G/TiO_xN_y/SiO_2/TiO_xN_y/ZrO_2$,
[1-17]: $G/TiO_xN_y/ZrO_2/SiO_2/TiO_xN_y/ZrO_2$,
[1-18]: $G/ZrO_2/TiO_xN_y/SiO_2/TiO_xN_y/ZrO_2$,
[1-19]: $G/TiO_xN_y/ZrO_2/SiO_2/ZrO_2/TiO_xN_y$,
[3-1]: $G/TiO_xN_y/SiO_2/TiO_xN_y/SiO_2/TiO_2$,
[3-2]: $G/TiO_xN_y/SiO_2/TiO_xN_y/SiO_2/TiO_xN_y$,
[3-3]: $G/ZrO_2/TiO_xN_y/SiO_2/TiO_xN_y/SiO_2/TiO_xN_y$.

The infrared reflection glass plate of the present invention comprises a glass plate and the stacked coating film (X) as mentioned above, and it may have a thin film (Y) having a single layer structure or a multilayer structure made of an inorganic material on either one of the glass plate side and the non-glass plate side or on both sides of the stacked coating film (X). In the thin film (Y), the geometrical thickness of each layer constituting the thin film (Y) is less than 70 nm, preferably less than 50 nm. Whether the thin film less than 70 nm in contact with the stacked coating film (X) is a thin film in the stacked coating film (X) (a part of the multilayer film) or the thin film (Y) is distinguished by the refractive index. For example, in a case where a thin film less than 70 nm made of a material having a refractive index of at least 1.90 is in contact with the coating film (1) of the stacked coating film (X), the thin film is a part of the high refractive index multilayer film (1b), and in a case where a thin film less than 70 nm made of a material having a refractive index less than 1.90 is in contact with the coating film (1) of the stacked coating film (X), the thin film is the thin film (Y).

Although the thin film (Y) is not the main film to impart infrared reflection performance to the glass plate, it may affect the infrared reflection performance. Further, in order to fulfill the role to determine the reflected colors, the visible light transmittance, etc., in a case where the thin film (Y) is laminated, all the films including the thin film (Y) are considered to be related to optical characteristics.

The thin film (Y) may be an adhesive force-adjusting film which adjusts adhesive properties to the interlayer.

The infrared reflection glass plate in the present invention is suitable for a vehicle window (particularly a laminated glass for an automobile), and is preferably formed into a laminated glass in such a structure that the surface on the non-glass side of the stacked coating film (X) is in contact with the interlayer. A laminated glass is required to have predetermined penetration resistance, and one factor which dominates the penetration resistance is the adhesive force between the interlayer and the stacked coating film (X).

Accordingly, it is preferred to laminate an adhesive force-adjusting film which adjusts the adhesive force between the interlayer and the stacked coating film (X) on the non-glass plate side of the stacked coating film (X). The adhesive force-adjusting film may, for example, be a thin film made of chromium oxide. The geometrical thickness of the adhesive force-adjusting film is preferably from 0.5 to 40 nm, particularly preferably from 5 to 40 nm.

Further, the thin film (Y) may be a film which adjusts the reflected colors or the like of the laminated glass. To impart infrared reflection function to a glass plate, in order to obtain desired optical characteristics by simply sequentially stacking the coating film (1) made of a high refractive index inorganic material and the coating film (2) made of a low refractive index inorganic material, the choices increase as the number of layers in the multilayer film increases. However, as described above, the durability of the film tends to deteriorate as the total thickness increases by stacking many layers, and accordingly a proper film structure is required. On the other hand, among many choices, a case may occur that the reflection spectrum in a wavelength region of from 400 to 800 nm, particularly from 400 to 600 nm has ripples of a maximum and a minimum in some cases.

If ripples occur, the wavelength at the reflection (transmission) maximum shifts due to variation (unevenness) of the film thickness in a plane, which is visually perceived as glitter of the reflected (transmitted) colors i.e. iridescence, and the reflected color distribution may occur or the infrared reflection performance may decrease. Accordingly, it is possible to suppress ripples in the reflection spectrum by forming the thin film (Y) on either one of the glass plate side and the non-glass plate side or on both sides of the stacked coating film (X). Namely, by forming the thin film (Y) on either one of the glass plate side and the non-glass plate side or on both sides of the stacked coating film (X), it is possible to obtain an infrared reflection glass plate having a $T_e$ maintained to be at most 45%, which suppresses ripples in the reflection spectrum, which has favorable outer appearance and which is excellent in optical characteristics (excellent in heat insulating performance).

The thin film (Y) to be formed for the purpose of suppressing the ripples preferably has a refractive index difference at the interface with the stacked coating film, and the refractive index difference between the layer of the thin film (Y) and the coating film in the stacked coating film (X) in contact with each other is preferably at least 0.3, particularly preferably at least 0.5. Further, the thin film (Y) preferably has a multilayer structure having films differing in the refractive index stacked.

In a case where the infrared reflection glass is used as a laminated glass, the thin film (Y) to suppress the ripples is preferably a thin film (Y) having a high refractive index layer (c) made of a high refractive index inorganic material having a refractive index of at least 1.90 and having a geometrical thickness of from 5 to 40 nm and a low refractive index layer (d) made of a low refractive index inorganic material having a refractive index of at most 1.56 and having a geometrical thickness of from 5 to 40 nm alternately stacked in a totally even number of layers, the layer in contact with the coating film (1) of the stacked coating film (X) being the low refractive index layer (d).

The high refractive index layer (c) in the thin film (Y) may, for example, be a layer of titanium oxide, a layer of titanium oxynitride, a layer of zinc oxide, a layer of tantalum oxide, a layer of zirconium oxide, a layer of niobium oxide, a layer of tin oxide, a layer of titanium nitride, a layer of silicon nitride, a layer of zirconium nitride, a layer of aluminum nitride, or a layer of zirconium oxynitride or tin oxynitride, and is preferably a titanium oxide layer. The low refractive index layer (d) may, for example, be a layer of silicon oxide, a layer of magnesium fluoride or a layer of a composite oxide of silicon oxide with another material (e.g. Al, F, C, B or P), and is preferably a layer of silicon oxide.

Further, the thin film (Y) may be a multilayer thin film comprising the above film to suppress the ripples and the adhesive force-adjusting film to adjust the adhesive force to the interlayer laminated on the non-glass surface side of the above film.

Further, the thin film (Y) may be present at one or more interfaces between the coating film (1) and the coating film (2) in the stacked coating film (X). In such a case, the material constituting the thin film (Y) may be a material having a refractive index higher than 1.56 and less than 1.90. Further, the thin film (Y) in this case also is a film having no optical thickness required for infrared reflection and thereby has no influence over the infrared reflection.

The geometrical thickness (total thickness) of the entire infrared reflection film including the thin film (Y) is preferably from 250 to 700 nm, particularly preferably from 300 to 500 nm, from the viewpoint of favorable durability.

As the infrared reflection glass plate of the present invention, the following examples may be mentioned. Among them, preferred are (2) to (4) and (6) to (8), particularly preferred are (2) and (3), and especially preferred is (3), with a view to effectively suppressing ripples and maintaining durability of the film. In the following examples, the glass plate is represented by G, the coating film (1) made of a high refractive index inorganic material in the stacked coating film (X) is represented by H, and the coating film (2) made of a low refractive index inorganic material is represented by L. Further, the high refractive index layer in the thin film (Y) is represented by H', and the low refractive index layer is represented by L'. Further, the order of stacking from the glass plate is represented by the index. The layers constituting the stacked thin film (X) are put in a bracket [ ], and the layers constituting the thin film (Y) are put in a bracket { }.

(1): G/[stacked coating film (X) ($H_1/L_2/H_3$)],
(2): G/{thin film (Y) ($H'_1/L'_2$)}/[stacked coating film (X) ($H_3/L_4/H_5$)],
(3): G/[stacked coating film (X) ($H_1/L_2/H_3$)]/{thin film (Y) ($L'_4/H'_5$)},
(4): G/{thin film (Y) ($H'_1/L'_2$)}/[stacked coating film (X) ($H_3/L_4/H_5$)]/{thin film (Y) ($L'_6/H'_7$)},
(5): G/[stacked coating film (X) ($H_1/L_2/H_3/L_4/H_5$),
(6): G/{thin film (Y) ($H'_1/L'_2$)}/[stacked coating film (X) ($H_3/L_4/H_5/L_6/H_7$)],
(7): G/[stacked coating film (X) ($H_1/L_2/H_3/L_4/H_5$)]/{thin film (Y) ($L'_6/H'_7$)},
(8): G/{thin film (Y) ($H'_1/L'_2$)}/[stacked coating film (X) ($H_3/L_4/H_5/L_6/H_7$)]/{thin film (Y) ($L'_8/H'_9$)}.

Specifically, infrared reflection glass plates having the following structures may, for example, be mentioned.

(1-1): G/[$ZrO_2/TiO_xN_y/SiO_2/ZrO_2/TiO_xN_y$)],
(1-2): G/[$ZrO_2/TiO_xN_y/SiO_2/ZrO_2/TiO_xN_y$]/{$SiO_2/TiO_2$},
(1-3): G/[$ZrO_2/TiO_xN_y/SiO_2/ZrO_2/TiO_xN_y$]/{$SiO_2/TiO_2/CrO_x$},
(1-4): G/{$SiO_2/TiO_2$}/[$ZrO_2/TiO_xN_y/SiO_2/ZrO_2/TiO_xN_y$],
(1-5): G/{$SiO_2/TiO_2$}/[$ZrO_2/TiO_xN_y/SiO_2/ZrO_2/TiO_xN_y$]/{$SiO_2/TiO_2$},
(1-6): G/[$TiO_xN_y/SiO_2/ZrO_2/TiO_xN_y$],
(1-7): G/[$TiO_xN_y/SiO_2/ZrO_2/TiO_xN_y$]/{$SiO_2/TiO_2$},
(1-8): G/[$ZrO_2/TiO_xN_y/SiO_2/TiO_xN_y$],
(1-9): G/[$ZrO_2/TiO_xN_y/SiO_2/TiO_xN_y$]/{$SiO_2/TiO_2$},
(1-10): G/[$TiO_xN_y/SiO_2/ZrO_2/TiO_2$],
(1-11): G/[$ZrO_2/TiO_2/SiO_2/TiO_xN_y$],
(1-12): G/[$ZrO_2/TiO_2/SiO_2/ZrO_2/TiO_xN_y$],
(3-1): G/[$TiO_xN_y/SiO_2/TiO_xN_y/SiO_2/TiO_2$],
(3-2): G/[$TiO_xN_y/SiO_2/TiO_xN_y/SiO_2/TiO_xN_y$]/{$SiO_2/TiO_2$},
(3-3): G/[$ZrO_2/TiO_xN_y/SiO_2/TiO_xN_y/SiO_2/TiO_xN_y$]/{$SiO_2/TiO_2$},
(3-4): G/[$ZrO_2/TiO_xN_y/TiO_xN_y/SiO_2/TiO_xN_y$]/{$SiO_2/TiO_2/CrO_x$}.

The infrared reflection glass plate in the present invention, of which the infrared reflection film has the above structure, can provide a high solar reflectance and a small solar transmittance while securing radio wave transmission properties when formed into a laminated glass, and is excellent in durability.

The infrared reflection glass plate of the present invention preferably has radio wave transmission properties sufficiently secured since it is suitably used for a vehicle window. Specifically, the sheet resistance of the infrared reflection film is preferably at least 1 k$\Omega$/□, more preferably at least 1 M$\Omega$/□, furthermore preferably at least 1 G$\Omega$/□. The higher the sheet resistance, the better, and accordingly the upper limit is not particularly limited. Further, a material forming the infrared reflection film has, when subjected to heat treatment, a higher sheet resistance than the sheet resistance before heat treatment since oxidation of the material proceeds.

The infrared reflection glass plate of the present invention includes an infrared reflection glass plate produced by applying heat treatment in e.g. bending or tempering to a precursor of the infrared reflection glass plate. The precursor (of the infrared reflection glass plate) in the present invention means the infrared reflection glass plate of the present invention before heat treatment. Between the infrared reflection glass plate before heat treatment (i.e. the precursor) and the infrared reflection glass plate after heat treatment, there is usually a change in the material of the infrared reflection film in addition to changes of e.g. the shape which are the objects of the heat treatment. The change of the material is mainly caused by the process of oxidation of the material, and for example, the ratio of nitrogen atoms in titanium oxynitride decreases and the ratio of oxygen atoms increases. However, even the precursor itself has a function as an infrared reflection glass plate. Further, the infrared reflection glass plate of the present invention is not limited to one produced via heat treatment.

The infrared reflection glass plate of the present invention obtained via heat treatment can be produced by applying heat treatment in e.g. bending or tempering to the precursor of the infrared reflection glass. The heat treatment may be carried out under conditions which are usually employed in usual bending or tempering, and it can be carried out within a temperature range of from 550 to 700° C., preferably from 600 to 700° C. Specifically, it is carried out under conditions at a preset temperature of 650° C. for a heat treatment time of 15 minutes.

By heat treatment of the precursor, the material constituting the film of the precursor may undergo oxidation or does not change if its oxidation will no more proceed. When the material constituting the film before heat treatment is a metal oxide such as silicon oxide, titanium oxide, zirconium oxide or chromium oxide, it may undergo oxidation by heat treatment. Further, when the material constituting the film before heat treatment is an oxynitride such as titanium oxynitride or a nitride such as titanium nitride, it undergoes oxidation by heat treatment and releases nitrogen simultaneously. Accordingly, in the case of an oxynitride or a nitride, the ratio of nitrogen atoms contained in the material is decreased and the ratio of oxygen atoms is increased by heat treatment, and in some cases, the material becomes an oxide containing substantially no nitrogen atoms.

In a case where the coating film (1) in the infrared reflection glass plate after heat treatment is made of titanium oxide, the material of the corresponding coating film (1) in the precursor is preferably titanium oxynitride. In a case where the coating film (1) in the infrared reflection glass plate after heat treatment is made of titanium oxynitride, the material of the corresponding coating film (1) in the precursor is preferably titanium oxynitride having a higher ratio of nitrogen atoms to titanium atoms than that of titanium oxynitride after heat treatment. By use of such titanium oxynitride as the material of the coating film (1) of the precursor, cracks will be reduced as described above. Also when the coating film (1) is the high refractive index multilayer film (1b) and its main layer is a layer of a titanium compound, the corresponding layer before heat treatment is preferably the above-described layer of titanium oxynitride.

On the other hand, when the thin film (Y) includes a layer of titanium oxide, the corresponding layer in the precursor is not required to be a layer of titanium oxynitride. Since the layer of titanium oxide in the thin film (Y) is a thin layer as compared with the coating film (1), cracks are less likely to occur by heat treatment even when the layer of the precursor is a layer of titanium oxide. When a layer of titanium oxynitride is employed as the high refractive index layer of the thin film (Y) in the precursor, in the same manner as described above, the layer becomes a layer of titanium oxynitride having a reduced ratio of nitrogen atoms or a layer of titanium oxide by heat treatment.

Further, in a case where the coating film (1) is a coating film made of a material other than a titanium compound or the high refractive index multilayer film (1b) including a layer of such a material, since the volume shrinkage of such a material by heat treatment is usually small and the material adapts to the heat treatment, the need of changing the material is small. However, in the case of an oxide, the degree of oxidation may proceed. For example, the layer of zirconium oxide after heat treatment may be a layer of zirconium oxide in the precursor. Likewise, since the volume shrinkage of the material of the coating film (2) and the material of the low refractive index layer (d) in the thin film (Y) is small by heat treatment and they adopt to heat treatment, the need for changing the materials is small.

In the precursor in the present invention, all layers corresponding to the "layer of titanium oxide or titanium oxynitride" (i.e. a layer of a titanium compound) in the coating film (1) of the infrared reflection glass plate after heat treatment are preferably layers of titanium oxynitride. This applies to both a case where the coating film (1) is a single layer film and a case where it is a multilayer film. Further, since an oxynitride such as titanium oxynitride releases nitrogen by heat treatment and thereby has a reduced ratio of nitrogen atoms, titanium oxynitride in the precursor corresponding to the preferred infrared reflection glass plate (after heat treatment) is preferably titanium oxynitride having a higher ratio of nitrogen atoms as compared with that of titanium oxynitride in the infrared reflection glass plate.

In a case where in the infrared reflection glass plate after heat treatment, the coating film (1) contains titanium oxynitride ($TiO_xN_y$), in order to obtain favorable optical characteristics such as the reflectance and the transmittance, in titanium oxynitride, the ratio of nitrogen to titanium is preferably from 0.1 to 20%, particularly preferably from 1 to 15%, especially preferably from 1 to 10%.

In order to obtain an infrared reflection glass plate having such a nitrogen content after heat treatment, the nitrogen content in the layer of titanium oxynitride in the coating film (1) in the precursor is equal to or higher than the nitrogen content of the coating film (1) in the infrared reflection glass plate after heat treatment. Usually, the ratio of nitrogen to titanium is from 0.1 to 80%. Further, the effect of suppressing cracks at the time of heat treatment is related to the nitrogen content of titanium oxynitride. In order to obtain a higher effect of suppressing cracks, the ratio of nitrogen to titanium before heat treatment is particularly preferably from 1 to 20%, especially preferably from 2 to 15%.

In the present invention, the composition of the titanium oxynitride layer can be directly measured by a method employing RBS (Rutherford backscattering spectrometry) and NRA (Nuclear reaction analysis) in combination.

Further, by X-ray photoelectron spectroscopy (XPS), ESCA or the like, it is difficult to directly measure the composition of the titanium oxynitride layer (the ratios of oxygen and nitrogen in the titanium oxynitride layer, specifically, values x and y), but it can measure the ratio of nitrogen to titanium (N/Ti (%)). Even when it is difficult to directly measure the composition, approximate values can be estimated since the ratio of nitrogen to titanium is determined by measurement, and the value (x+y) is considered to be approximately from 1.8 to 2.1. For example, when the amount of nitrogen to titanium is 0.1%, once the value y is fixed, it is considered that x=1.799 to 2.099, and y=0.001.

As examples, values x and y in the preferred composition of the titanium oxynitride layer are shown in Table 2. These values are values calculated by fixing the value y, based on the above preconditions.

TABLE 2

| Ratio of nitrogen to titanium (%) | x | y |
|---|---|---|
| 0.1 | 1.799 to 2.099 | 0.001 |
| 1 | 1.79 to 2.09 | 0.01 |
| 2 | 1.78 to 2.08 | 0.02 |
| 10 | 1.70 to 2.00 | 0.10 |
| 15 | 1.65 to 1.95 | 0.15 |
| 20 | 1.60 to 1.80 | 0.20 |
| 80 | 1.00 to 1.30 | 0.80 |

Such an infrared reflection glass plate can be produced by heating the precursor of the infrared reflection glass plate to convert titanium oxynitride in the layer of titanium oxynitride in the precursor to titanium oxynitride having a decreased ratio of nitrogen atoms as compared with titanium oxynitride in the precursor. Further, in a case where the layer corresponding to the "layer of a titanium compound" in the infrared reflection glass plate is a layer of titanium oxide, it may be heated until the layer of titanium oxynitride in the precursor is converted to titanium oxide.

The infrared reflection glass plate (including the precursor) of the present invention can be produced by a method of laminating the above coating films and the thin film on the glass plate surface. The method of forming the respective coating films and the thin film is not particularly limited but is preferably a sputtering method.

The sputtering method may, for example, be a DC (direct current) sputtering method, an AC (alternating current) sputtering method, a radio frequency sputtering method or a magnetron sputtering method. Among them, a DC magnetron sputtering method and an AC magnetron sputtering method are preferred, in view of stable process and easy film deposition on a large area.

The material of the target and the composition of the sputtering gas are selected depending upon the type of the film to be deposited. Further, the sputtering conditions (e.g. pressure, temperature) are properly determined depending upon the type, the thickness and the like of the film to be deposited. The total pressure of the sputtering gas may be a pressure under which glow discharge is stably carried out.

Now, the present invention will be described with reference to formation of three coating films as an example.

As formation of the coating film made of titanium oxide, a method may suitably be mentioned of carrying out a reactive sputtering method using $TiO_x$ (1<x<2) as the target and using a gas containing a gas containing oxygen atoms as the sputtering gas.

As formation of the coating film made of titanium oxynitride, a method may suitably be mentioned of carrying out a reactive sputtering method using TiOX (1<x<2) as the target and using a gas containing a gas containing nitrogen atoms as the sputtering gas.

As formation of the coating film made of silicon oxide, a method may suitably be mentioned of carrying out a reactive sputtering method using silicon carbide (SiC) or polycrystalline silicon as the target and using a gas containing a gas containing oxygen atoms as the sputtering gas.

As formation of the coating film made of zirconium oxide, a method may suitably be mentioned of carrying out reactive sputtering using Zr as the target and using a gas containing a gas containing oxygen atoms as the sputtering gas.

The target may be doped with a known dopant such as Al, Si or Zn within a range not to impair the scope of the present invention.

The gas containing a gas containing nitrogen atoms is not particularly limited so long as it contains a gas containing nitrogen atoms, and it may, for example, be a gas containing nitrogen atoms, or a gas mixture of a gas containing nitrogen atoms with an inert gas. The gas containing nitrogen atoms may, for example, be nitrogen gas ($N_2$), $N_2O$, NO, $NO_2$ or $NH_3$. The inert gas may, for example, be a rare gas such as helium, neon, argon, krypton or xenon. Among them, in view of economical efficiency and easiness of discharge, argon is preferred.

The gas containing nitrogen atoms may be used alone or as a mixture of two or more of them.

The gas containing a gas containing oxygen atoms is not particularly limited so long as it contains a gas containing oxygen atoms, and it may, for example, be a gas containing oxygen atoms or a gas mixture of a gas containing oxygen atoms with an inert gas. The gas containing oxygen atoms may, for example, be oxygen gas ($O_2$) or carbon dioxide gas ($CO_2$). The inert gas is as mentioned above. The gas containing a gas containing oxygen atoms may be used alone or as a mixture of two or more of them.

Now, the laminated glass for a vehicle window having the structure (B) will be described below. Hereinafter a resin film having an infrared reflection film will sometimes be referred to as a "film provided with an infrared reflection film".

In the laminated glass for a vehicle window having the structure (B), the resin film is preferably a film of a PET, a PEN, an acrylic resin, a methacrylic resin, a polycarbonate or the like. The thickness of the resin film is usually from 30 to 500 μm.

The infrared reflection film to be formed on the resin film is the same as the infrared reflection film formed on the glass plate in the above structure (A), and the preferred embodiments are also the same. Further, the film provided with an infrared reflection film is also the same except that the glass plate in the infrared reflection glass plate described for the structure (A) is replaced with a film, and the preferred embodiments are also the same. Further, due to restriction from the upper limit temperature of the resin as the material of the film, usually heat treatment is not applied to the film provided with an infrared reflection film. A method of forming the infrared reflection film on the resin film is preferably a sputtering method in the same manner as the structure (A).

Further, the first glass plate, the second glass plate, the interlayer and the infrared shielding fine particles blended in the interlayer are also the same as in the above structure (A).

In the laminated glass for a vehicle window having the structure (B), the film provided with an infrared reflection film are sandwiched between two interlayers.

In such a case, the thickness of each interlayer is half (usually 0.38 mm) the thickness of the interlayer to be used for the laminated glass for a vehicle window having the structure (A).

A process for producing the laminated glass for a vehicle window having the structure (B) is not particularly limited, and it may, for example, be a process of laminating on a first glass plate as the car exterior side glass plate, a usual first interlayer, the film provided with an infrared reflection film, an infrared shielding fine particles-dispersed interlayer and a second glass plate as the car interior side glass plate, followed by temporally bonding and then bonding in an autoclave.

The laminated glass for a vehicle window of the present invention, of which with respect to light incident from the second glass plate side, the reflectance to light at all wavelengths of from 900 to 1,100 nm is from 30 to 50%, the absorptivity to light at all wavelengths of from 1,100 to 1,300 nm is from 35 to 60%, and the transmittance to light at all wavelengths of from 900 to 1,500 nm is at most 30%, can be a laminated glass for a vehicle window which provides a high solar reflectance and a low solar transmittance while securing radio wave transmission properties and which is excellent in heat insulating performance. Further, a laminated glass for a vehicle window using the glass plate provided with an infrared reflection film as in the structure (A), is excellent in durability. Further, it can provide favorable visibility since the haze is prevented and the reflected image is not distorted.

Further, the laminated glass for a vehicle window of the present invention, of which with respect to light incident from the second glass plate side, the reflectance to light at a wavelength of 900 nm is from 20 to 40%, the reflectance to light at all wavelengths of from 1,000 to 1,100 nm is from 30 to 50%, the absorptivity to light at all wavelengths of from 1,100 to 1,300 nm is from 35 to 60%, and the transmittance to light at all wavelengths of from 900 to 1,500 nm is at most 30%, can be a laminated glass for a vehicle window which has no influences over function of an infrared sensor such as an optical beacon, which provides a high solar reflectance and a low solar transmittance while securing radio wave transmission properties and which is excellent in heat insulating performance.

EXAMPLES

Now, the present invention will be described in further detail with reference to Examples, but the present invention is by no means restricted to such specific Examples. Examples 1 to 8 are Examples, and Examples 9 to 12 are Comparative Examples.

In the present invention, the absorptivity=1−(transmittance+reflectance). Further, Examples by simulation were conducted based on data obtained by measuring the refractive index at each wavelength and the extinction coefficient at each wavelength with respect to a sample formed in a single layer from a material constituting each coating film on a glass plate.

Examples of Glass

Three types of glass plates having a thickness of 2 mm, having dimensions of 100 mm×100 mm (Examples 1 to 3), 200 mm×200 mm (Examples 4 to 6) and about 1,200 mm×about 1,650 mm (Examples 7 and 8) were prepared. The three types of glass plates are mentioned hereinafter. In Examples 7 and 8, using a sample obtained by depositing an infrared reflection film on the glass plate of the above size and then cutting the glass plate into a size of 100 mm×100 mm, evaluation of the infrared reflection glass, preparation of a laminated glass and evaluation of the laminated glass were conducted. Further, the spectral properties of the glass plate itself were also evaluated using a sample of 100 mm×100 mm.

(1) Transparent and colorless soda lime silica glass (manufactured by Asahi Glass Company, Limited, hereinafter referred to as FL1)

(2) Transparent and colorless soda lime silica glass (manufactured by Glayerbel S.A., hereinafter referred to as FL2)

(3) Green transparent soda lime silica glass having ultraviolet absorption performance (manufactured by Asahi Glass Company, Limited, hereinafter referred to as "UVFL1").

In preparation of a laminated glass having a structure shown in FIG. 1 on the assumption that FL1 or FL2 is used for a car exterior side glass plate and UVFL1 is used for a car interior side glass plate, UVFL1 was used as a glass plate 11 and FL1 or FL2 was used as a glass plate 12.

With respect to such a glass plate, the transmittance and the reflectance at wavelengths of from 300 to 2,100 nm were measured by a spectrophotometer (U4100 manufactured by Hitachi, Limited), and the visible light transmittance $T_v$ (%), the solar transmittance $T_e$ (%), the visible light reflectance $R_v$ (%) and the solar reflectance $R_e$ (%) were determined in accordance with JIS R3106. The results are shown in Table 3.

Further, a graph illustrating spectral transmittances of glass plates is shown in FIG. 3(a), and a graph illustrating spectral reflectances of glass plates is shown in FIG. 3(b). The vertical axis represents the transmittance (%) or reflectance (%), and the horizontal axis represents the wavelength (nm). In FIG. 3, transparent and colorless glass 1 corresponds to FL1, transparent and colorless glass 2 corresponds to FL2, colored transparent glass 1 corresponds to UVFL1 and colored transparent glass 2 corresponds to UVFL2. UVFL2 is not used in this Example, but this glass plate can also be used for the present invention.

TABLE 3

|       | $T_v$ (%) | $T_e$ (%) | $R_v$ (%) | $R_e$ (%) |
|-------|-----------|-----------|-----------|-----------|
| FL1   | 90.8      | 87.9      | 8.2       | 7.7       |
| FL2   | 90.7      | 87.5      | 8.1       | 7.7       |
| UVFL1 | 81.3      | 61.7      | 7.8       | 6.5       |
| UVFL2 | 80.2      | 58.9      | 7.2       | 6.0       |

Examples of Infrared Reflection Film

Eight types of glass plates 20 provided with an infrared reflection film having the structure shown in FIG. 1, having the following film structures were prepared (Film Examples 1 to 8). The numbers in brackets represent geometrical thicknesses (nm) of the respective coating films. Further, the refractive indices of materials used in Film Examples 1 to 8 are shown in Table 4. These values are values at a wavelength of 550 nm and are values in a state where no heat treatment is applied.

TABLE 4

|                  | Titanium oxynitride | Titanium oxide | Zirconium oxide | Silicon oxide |
|------------------|---------------------|----------------|-----------------|---------------|
| Film Ex. 1       | 2.435               | —              | —               | 1.458         |
| Film Ex. 2, 4 to 6 | 2.440             | —              | —               | 1.458         |
| Film Ex. 3       | 2.397               | —              | —               | 1.458         |
| Film Ex. 7 and 8 | 2.44                | 2.48           | 2.06            | 1.46          |

Film Example 1

FL1/TiO$_x$N$_y$(92)/SiO$_2$ (179)/TiO$_x$N$_y$(92)/SiO$_2$ (35)/TiO$_x$N$_y$(10)

Film Example 2

FL1/TiO$_x$N$_y$(96)/SiO$_2$ (170)/TiO$_x$N$_y$(95)/SiO$_2$ (28)/TiO$_x$N$_y$(11)

Film Example 3

FL1/TiO$_x$N$_y$(114)/SiO$_2$ (150)/TiO$_x$N$_y$(113)/SiO$_2$ (25)/TiO$_x$N$_y$(11)

Film Example 4

FL1/TiO$_x$N$_y$(104)/SiO$_2$ (176)/TiO$_x$N$_y$(104)/SiO$_2$ (30)/TiO$_x$N$_y$(11)

Film Example 5

FL1/TiO$_x$N$_y$(110)/SiO$_2$ (178)/TiO$_x$N$_y$(111)/SiO$_2$ (30)/TiO$_x$N$_y$(11)

Film Example 6

FL1/TiO$_x$N$_y$(95)/SiO$_2$ (180)/TiO$_x$N$_y$(103)/SiO$_2$ (26)/TiO$_x$N$_y$(11)

Film Example 7

FL1/ZrO$_2$ (20)/TiO$_x$N$_y$(120)/SiO$_2$ (185)/ZrO$_2$ (20)/TiO$_x$N$_y$(120)/SiO$_2$(30)/TiO$_2$(8)

Film Example 8

FL2/ZrO$_2$ (17)/TiO$_x$N$_y$(102)/SiO$_2$ (182)/ZrO$_2$ (17)/TiO$_x$N$_y$(100)/SiO$_2$ (28)/TiO$_2$ (7)

Of each of the titanium oxynitride layers in Film Examples 1 to 6, the ratio of nitrogen to titanium was measured by ESCA, and values x and y were determined by the above preconditions disclosed in the description.

The results are based on data measured with respect to a sample obtained by depositing only a titanium oxynitride layer (thickness: about 100 nm) on a glass plate, followed by heat treatment at 650° C. for 15 minutes. It is considered that the ratio of nitrogen to titanium in the sample in which only a titanium oxynitride layer was deposited is the same as that measured in an infrared reflection glass plate. In Table, the ratio of nitrogen to titanium is represented by N/Ti (%).

TABLE 5

|              | Before heat treatment | | | After heat treatment | | |
|--------------|-----------------------|---|---|----------------------|---|---|
|              | N/Ti (%) | x | y | N/Ti (%) | x | y |
| Film Ex. 1   | 7.9 | 1.721 to 2.021 | 0.079 | 6.3 | 1.737 to 2.737 | 0.063 |
| Film Ex. 2 and 4 to 6 | 4.6 | 1.754 to 2.054 | 0.046 | 4.0 | 1.760 to 2.060 | 0.040 |
| Film Ex. 3   | 14.3 | 1.657 to 1.957 | 0.143 | 4.1 | 1.761 to 2.061 | 0.041 |

Further, of the titanium oxynitride layer in the infrared reflection glass plate in Film Example 8, the composition before and after heat treatment was measured to determine the ratio of nitrogen to titanium and values x and y. Heat treatment was carried out at 650° C. for 15 minutes.

The composition was measured by a method of employing RBS (Rutherford backscattering spectrometry) and NRA (Nuclear reaction analysis) in combination. By this method, the composition can directly be measured, and the error is at a level of ±10%.

TABLE 6

| | Composition | | | | | |
|---|---|---|---|---|---|---|
| | Ti (at %) | O (at %) | N (at %) | N/Ti (%) | x | y |
| Before heat treatment | 34.1 | 63.2 | 2.7 | 7.9 | 1.853 | 0.079 |
| After heat treatment | 33.8 | 63.7 | 2.4 | 7.1 | 1.885 | 0.071 |

The infrared reflection film was deposited as follows.

Film Examples 1 to 6

Each of the infrared reflection films in Film Examples 1 to 6 was prepared by stacking a $TiO_xN_y$ layer and a $SiO_2$ layer in this order in a total layer numbers of 5 on a glass plate.

($TiO_xN_y$ Layer)

A $TiO_x$ (1<x<2) target as the sputtering target was placed on a cathode in a vacuum chamber, and the vacuum chamber was evacuated of air to $1.3 \times 10^{-3}$ Pa or below. Then, a gas mixture of argon gas with nitrogen gas was introduced as the sputtering gas. On that occasion, the pressure was $7.0 \times 10^{-1}$ Pa. In such a state, a reactive sputtering method was carried out by using a DC pulse power supply to form a $TiO_xN_y$ film on a second glass plate (FL) placed in the vacuum chamber. As the sputtering gases in Film Examples 1 to 6, the following gas mixtures were used. Film Example 1: 90 sccm of argon gas and 10 sccm of nitrogen gas, Film Examples 2 and 4 to 6:95 sccm of argon gas and 5 sccm of nitrogen gas and Film Example 3: 80 sccm of argon gas and 20 sccm of nitrogen gas.

($SiO_2$ Layer)

A SiC target as the sputtering target was placed on a cathode in a vacuum chamber, and the vacuum chamber was evacuated of air to $1.3 \times 10^{-3}$ Pa or below. Then, a gas mixture of 40 sccm of argon gas with 60 sccm of oxygen gas was introduced as the sputtering gas. On that occasion, the pressure was $6.0 \times 10^{-1}$ Pa. In such a state, a reactive sputtering method was carried out by using a DC pulse power supply to form a $SiO_2$ film on the coating film (1) of the object to be treated placed in the vacuum chamber.

Film Examples 7 and 8

Each of the infrared reflection films in Film Examples 7 and 8 was obtained by depositing a $ZrO_2$ film, a $TiO_xN_y$ film, a $SiO_2$ film, a $ZrO_2$ film, a $TiO_xN_y$ film, a $SiO_2$ film and a $TiO_2$ film in this order on a glass plate in accordance with the following procedure.

($ZrO_2$ Layer)

A Zr target as the sputtering target was placed on a cathode in a vacuum chamber, and the vacuum chamber was evacuated of air to $1.3 \times 10^{-3}$ Pa or below. Then, oxygen gas and argon gas in a ratio (volume ratio) of 70:30 as the sputtering gas were introduced until the pressure became $4.0 \times 10^{-1}$ Pa. In such a state, a reactive sputtering method was carried out by using a DC pulse power supply to form a $ZrO_2$ layer on an object to be treated placed in the vacuum chamber.

($TiO_xN_y$ Layer)

A $TiO_x$ (1<x<2) target as the sputtering target was placed on the cathode in the vacuum chamber, and the vacuum chamber was evacuated of air to $1.3 \times 10^{-3}$ Pa or below. Then, argon gas, nitrogen gas and oxygen gas in a ratio (volume ratio) of 70:13:17 as the sputtering gas were introduced until the pressure became $4.0 \times 10$—Pa. In such a state, a reactive sputtering method was carried out by using a DC power supply to form a $TiO_xN_y$ layer on the object to be treated placed in the vacuum chamber.

($SiO_2$ Layer)

A Si target as the sputtering target was placed on the cathode in the vacuum chamber, and the vacuum chamber was evacuated of air to $1.3 \times 10^{-3}$ Pa or below. Then, argon gas and oxygen gas in a ratio (volume ratio) of 39:61 as the sputtering gas were introduced until the pressure became $4.0 \times 10^{-1}$ Pa. In such a state, a reactive sputtering method was carried out by using an AC power supply to form a $SiO_2$ layer on the object to be treated placed in the vacuum chamber.

($TiO_2$ Layer)

A $TiO_x$ (1<x<2) target as the sputtering target was placed on the cathode in the vacuum chamber, and the vacuum chamber was evacuated of air to $1.3 \times 10^{-3}$ Pa or below. Then, argon gas and oxygen gas in a ratio (volume ratio) of 30:70 as the sputtering gas were introduced until the pressure became $4.0 \times 10^{-1}$ Pa. In such a state, a reactive sputtering method was carried out by using a DC power supply to form a $TiO_2$ layer on the object to be treated placed in the vacuum chamber.

Of the infrared reflection glass on which the infrared reflection film was formed as described above, the reflectance at wavelengths of from 300 to 2,100 nm was measured by a spectrophotometer (U4100 manufactured by Hitachi, Limited) to determine the visible light reflectance $R_v$ (%) and the solar reflectance $R_e$ (%) in accordance with JIS R3106. In Examples 1 to 6, samples before heat treatment were measured, and in Examples 7 and 8, samples subjected to heat treatment at a preset temperature of 620° C. for 7 minutes using a roller-hearth furnace were measured. In the infrared reflection glasses in Examples 7 and 8, no cracks occurred in the film even after heat treatment.

Figure 4:
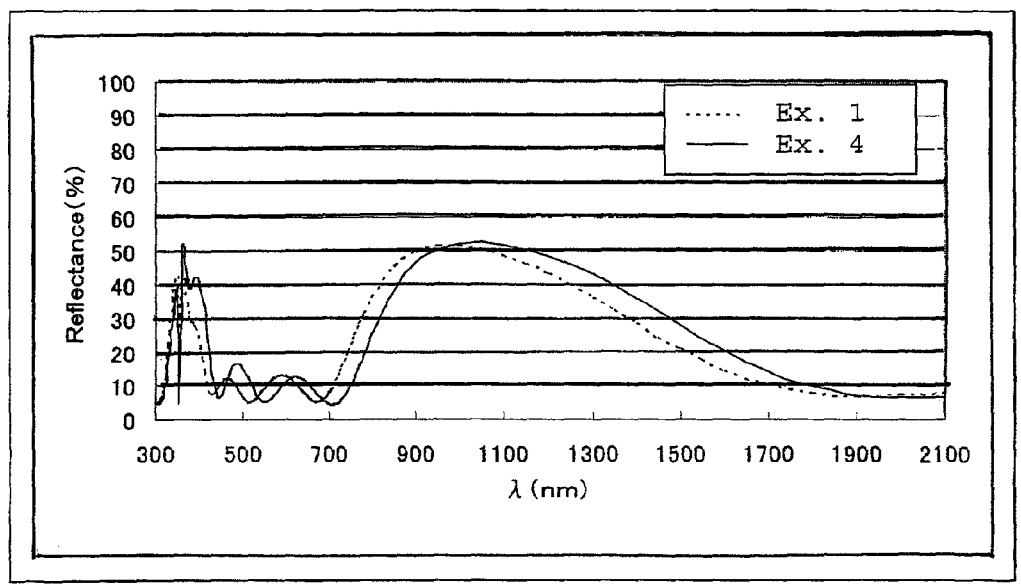
FIG. 4 is a graph illustrating spectral reflectances of infrared reflection glass plates in Examples 1 and 4.
Figure 5:
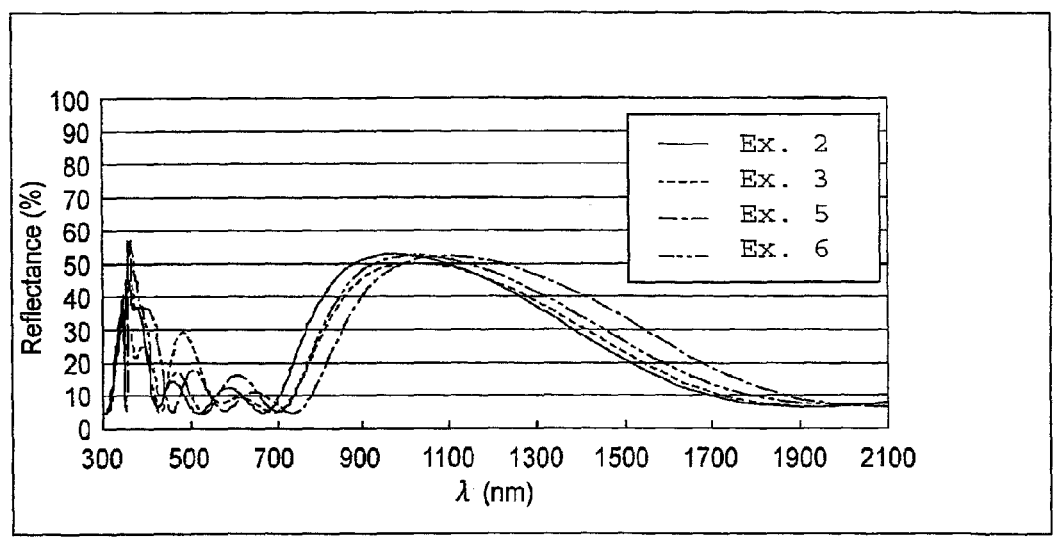
FIG. 5 is a graph illustrating spectral reflectances of infrared reflection glass plates in Examples 2, 3, 5 and 6.
Figure 6:
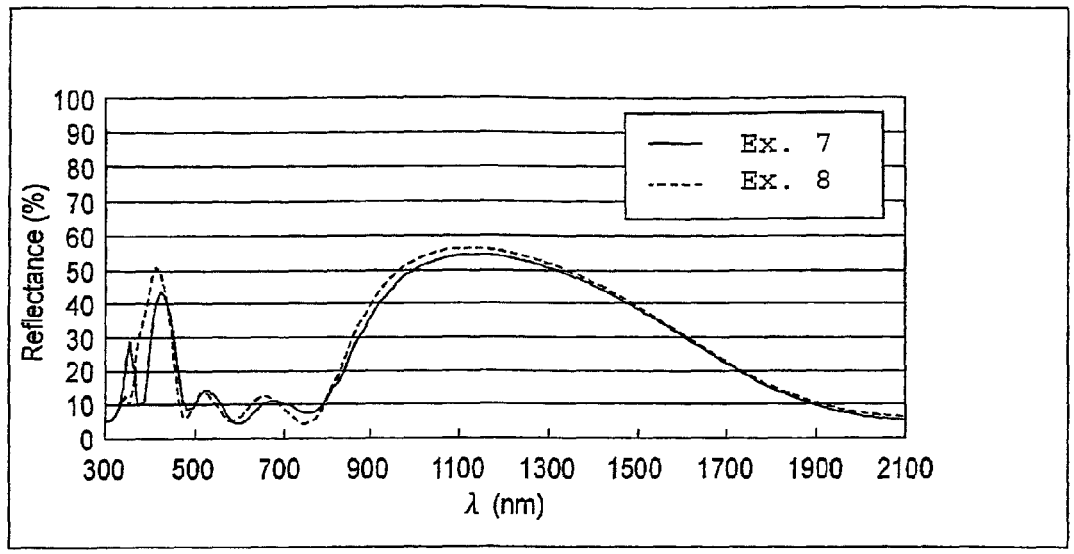
FIG. 6 is a graph illustrating spectral reflectances of infrared reflection glass plates in Examples 7 and 8.

Graphs illustrating spectral reflectances of such infrared reflection glass plates are shown in FIGS. 4 to 6.

TABLE 7

| Ex. | Rv (%) | $R_e$ (%) |
|---|---|---|
| 1 | 9.4 | 24.8 |
| 2 | 9.0 | 25.1 |
| 3 | 12.8 | 24.2 |
| 4 | 9.0 | 24.7 |
| 5 | 10.1 | 23.7 |
| 6 | 10.3 | 25.2 |
| 7 | 8.8 | 24.4 |
| 8 | 8.8 | 25.3 |

Examples of Laminated Glass

A laminated glass having a structure shown in FIG. 1 was prepared. The first glass plate 11 was the above-prepared UVFL glass plate, and the second glass plate 12 was the above-prepared FL glass plate having each of infrared reflection films 21 in Film Examples 1 to 8. For the interlayer 30, a PVB interlayer having ITO fine particles dispersed therein used for Coolverre (manufactured by Asahi Glass Company, Limited, registered trademark) was used. Hereinafter a laminated glass having the film in Film Example 1 will be referred to as a laminated glass in Example 1, and the same applies to the other Examples. The PVB interlayer had a thickness of 0.76 mm. Further, the ITO fine particles were particles having a content of particles having particle sizes of 40 nm or larger of 10 mass %, and their content is 0.2 mass % based on the PVB interlayer.

Of the laminated glasses in Examples 1 to 8 thus obtained, the visible light transmittance $T_v$ (%), the solar transmittance $T_e$ (%), the visible light reflectance $R_v$ (%) and the solar reflectance $R_e$ (%) to light incident from the second glass plate 12 side were obtained. Values in Examples 1 to 6 are values by simulation based on spectral properties data of the infrared reflection glass plate, and values in Examples 7 and 8 are values determined in accordance with JIS R3106 with respect to transmittances and reflectances at wavelengths of from 300 to 2,100 nm measured by a spectrophotometer (U4100, manufactured by Hitachi, Limited).

Further, the sheet resistance (GΩ/□) of each of the infrared reflection films in Film Examples 1 to 8 was measured by a two-probe resistivity meter (HIRESTA IP, manufactured by Mitsubishi Petrochemical Co., Ltd.) before preparation of the laminated glass (after film formation and before heat treatment). After heat treatment, oxidation of the film material proceeds, whereby the resistance will be higher than the measured value, and thus it is found that each of the sheet resistances of the infrared reflection films in Film Examples 1 to 8 after formation of a laminated glass is higher than 1 kΩ/□ (1 GΩ/□).

Further, for comparison, comparative samples (Examples 9 to 11) were prepared in the same manner as in Examples 1 to 8 except that a FL glass plate having no infrared reflection film formed was used. The structure of the comparative samples is FL1/ITO fine particles-dispersed PVB interlayer/ UVFL1.

Figure 7:
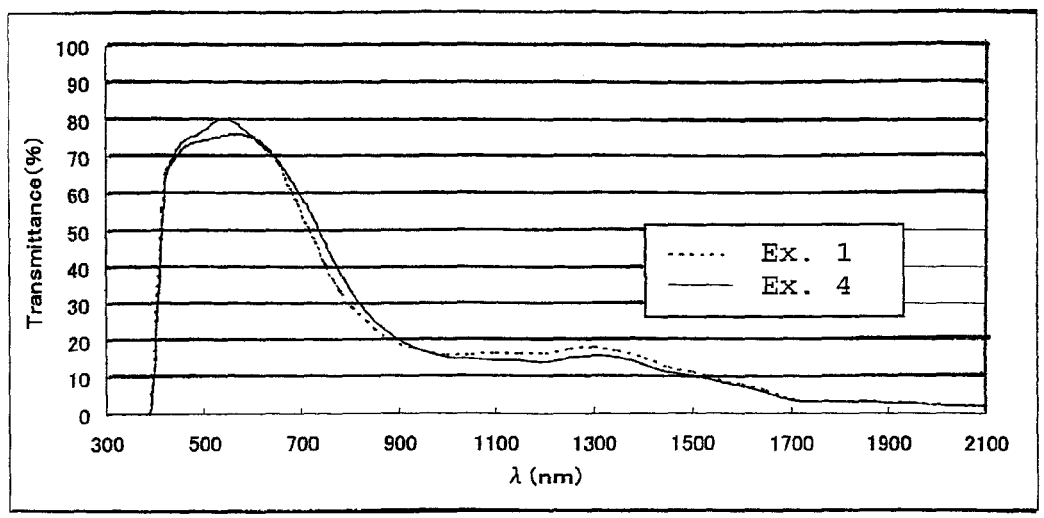
FIG. 7 is a graph illustrating spectral transmittances of laminated glasses in Examples 1 and 4.
Figure 8:
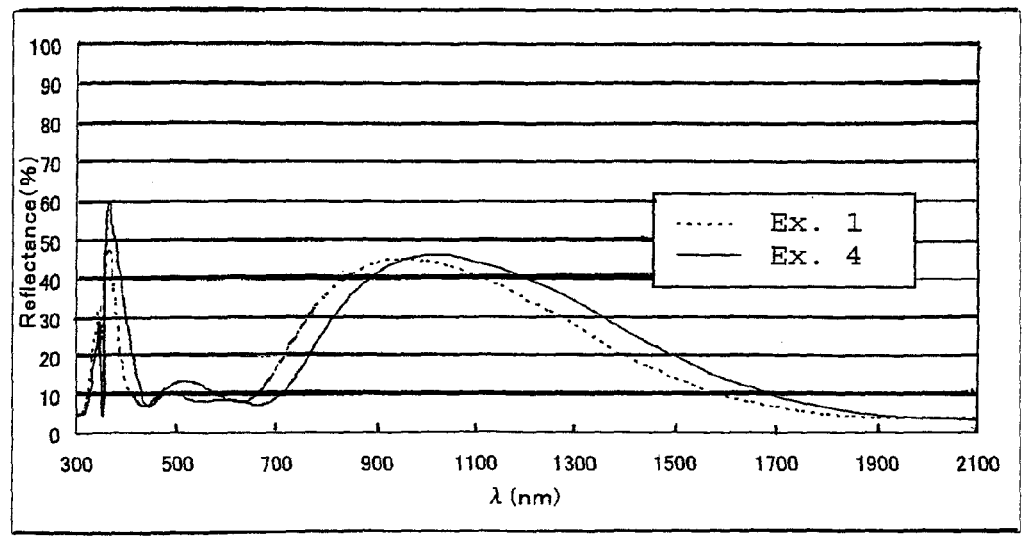
FIG. 8 is a graph illustrating spectral reflectances of laminated glasses in Examples 1 and 4.
Figure 9:
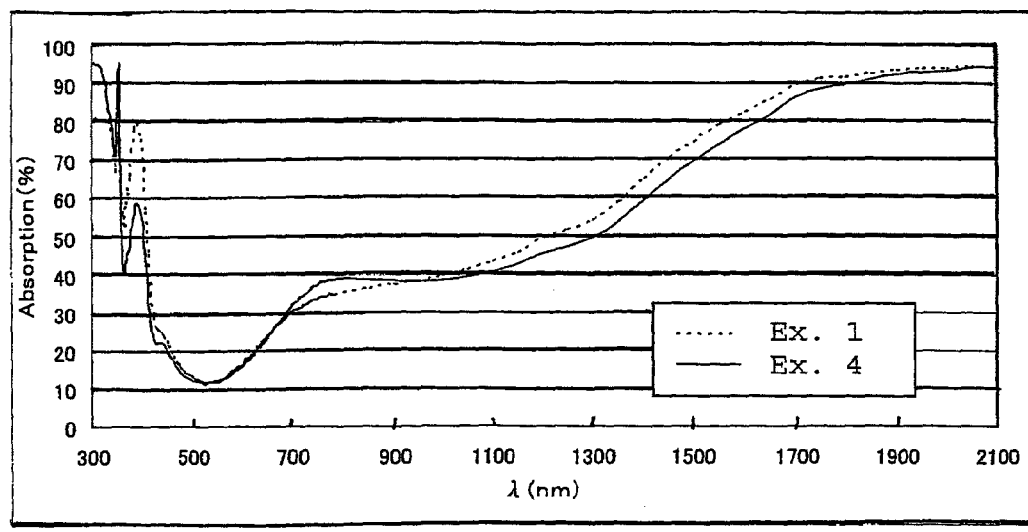
FIG. 9 is a graph (c) illustrating spectral absorptivities of laminated glasses in Examples 1 and 4.
Figure 10:
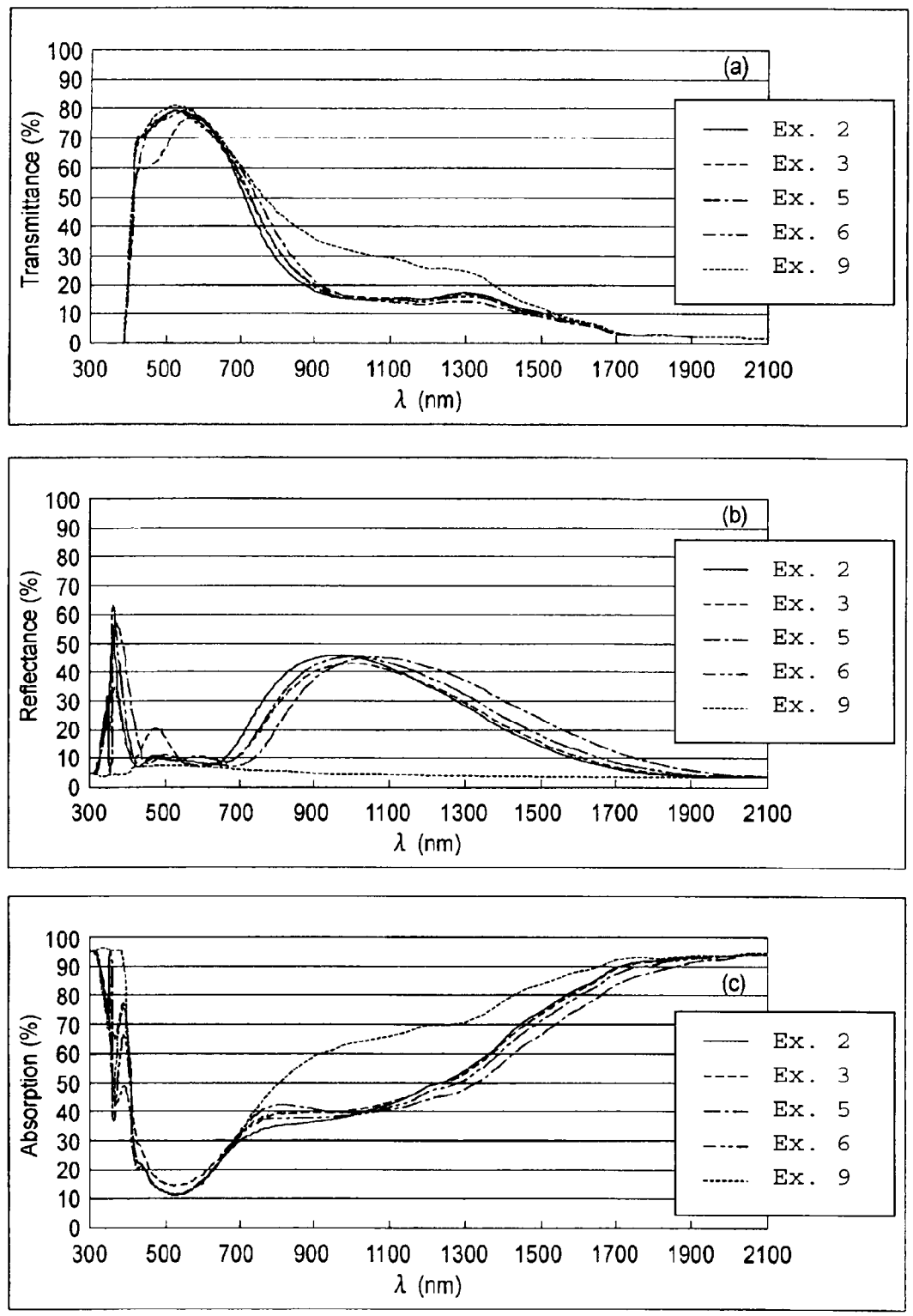
FIG. 10 is a graph (a) illustrating spectral transmittances, a graph (b) illustrating spectral reflectances and a graph (c) illustrating spectral absorptivities of laminated glasses in Examples 2, 3, 5, 6 and 9.
Figure 11:
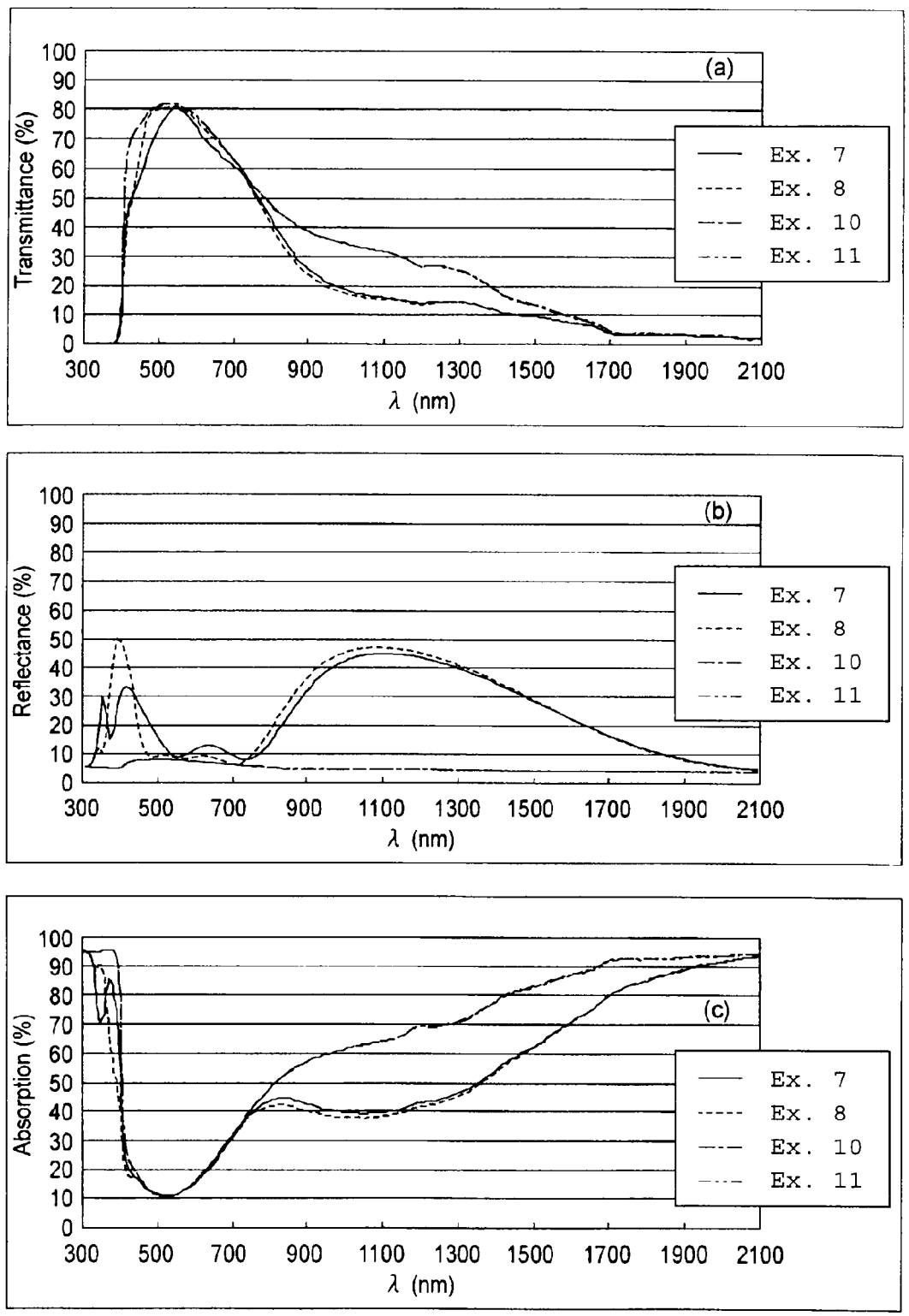
FIG. 11 is a graph (a) illustrating spectral transmittances, a graph (b) illustrating spectral reflectances and a graph (c) illustrating spectral absorptivities of laminated glasses in Examples 7, 8, 10 and 11.

Of the samples in Examples 9 to 11 also, the visible light transmittance $T_v$ (%), the solar transmittance $T_e$ (%), the visible light reflectance $R_v$ (%) and the solar reflectance $R_e$ (%) to light incident from the second glass plate 12 side were obtained. Further, the visible light absorptivity $A_v$ (%) and the solar absorptivity $A_e$ (%) were determined. The results are shown in Table 8. In FIGS. 7 to 9, graphs illustrating spectral transmittances, spectral reflectances and spectral absorptivities are shown.

TABLE 8

| Ex. | $T_v$ (%) | $T_e$ (%) | $R_v$ (%) | $R_e$ (%) | $A_v$ (%) | $A_e$ (%) | Resistance (GΩ/□) |
|---|---|---|---|---|---|---|---|
| 1 | 74.7 | 40.2 | 11.2 | 22.8 | 14.1 | 37.0 | 3.5 |
| 2 | 77.1 | 40.9 | 8.9 | 21.8 | 14.0 | 37.3 | 70.0 |
| 3 | 73.8 | 40.0 | 10.3 | 20.3 | 15.9 | 39.7 | 3.0 |
| 4 | 77.6 | 41.8 | 8.7 | 22.1 | 13.7 | 36.2 | 370 |
| 5 | 77.1 | 42.4 | 9.2 | 20.9 | 13.7 | 36.7 | 430 |
| 6 | 75.0 | 41.6 | 11.3 | 21.7 | 13.7 | 36.7 | 1800 |
| 7 | 75.8 | 42.1 | 11.0 | 22.4 | 13.2 | 35.5 | 300 |
| 8 | 77.9 | 43.2 | 8.9 | 22.5 | 13.2 | 34.4 | 200 |
| 9 | 78.9 | 48.4 | 7.4 | 5.7 | 13.8 | 46.0 | — |
| 10 | 79.0 | 49.7 | 7.6 | 5.9 | 13.4 | 44.3 | — |
| 11 | 79.0 | 49.7 | 7.6 | 5.9 | 13.4 | 44.4 | — |

As described above, by the laminated glass using the infrared reflection glass plate of the present invention, even when an infrared reflection film having radio wave transmission properties is used, $R_e$ of at least 20% is achieved while $T_e$ is at most 45%. The laminated glass using the infrared reflection glass plate of the present invention can efficiently reflects solar energy and suppress transmission of the solar energy entering the car interior, and is thereby excellent in heat insulating performance. Further, when the value $T_e$ is reduced only by a level of 1%, the scorching feeling by incident light is reduced, and accordingly the laminated glass using the infrared reflection glass of the present invention can reduce unpleasant feeling of passengers as compared with a conventional laminated glass having no infrared reflection film.

In addition, since $R_v$ can be suppressed to be at most 12%, it is considered that the maximum peak in the reflection spectrum in the visible region particularly in a region of from 400 to 600 nm can be suppressed, and it is found that a laminated glass having ripples suppressed, with small color irregularity can be obtained. Particularly laminated glasses in Examples 2, 4, 5 and 8 can suppress $R_v$ to at most 10% and are thereby considered to be laminated glasses excellent in outer appearance, suitably used also for an automobile window.

Example 12

With respect to a laminated glass having a structure in accordance with Example 5 disclosed in Patent Document 2, spectral properties are evaluated by simulation. The structure of the laminated glass in Example 12 is as follows. GZO is a material comprising zinc oxide doped with 3 to 5% of gallium oxide.

FL1 (2 mm)/GZO (14 nm)/TiN (5.45 nm)/GZO (4 nm)/ ITO fine particles-dispersed interlayer (0.76 mm)/FL1 (2 mm).

Figure 12:
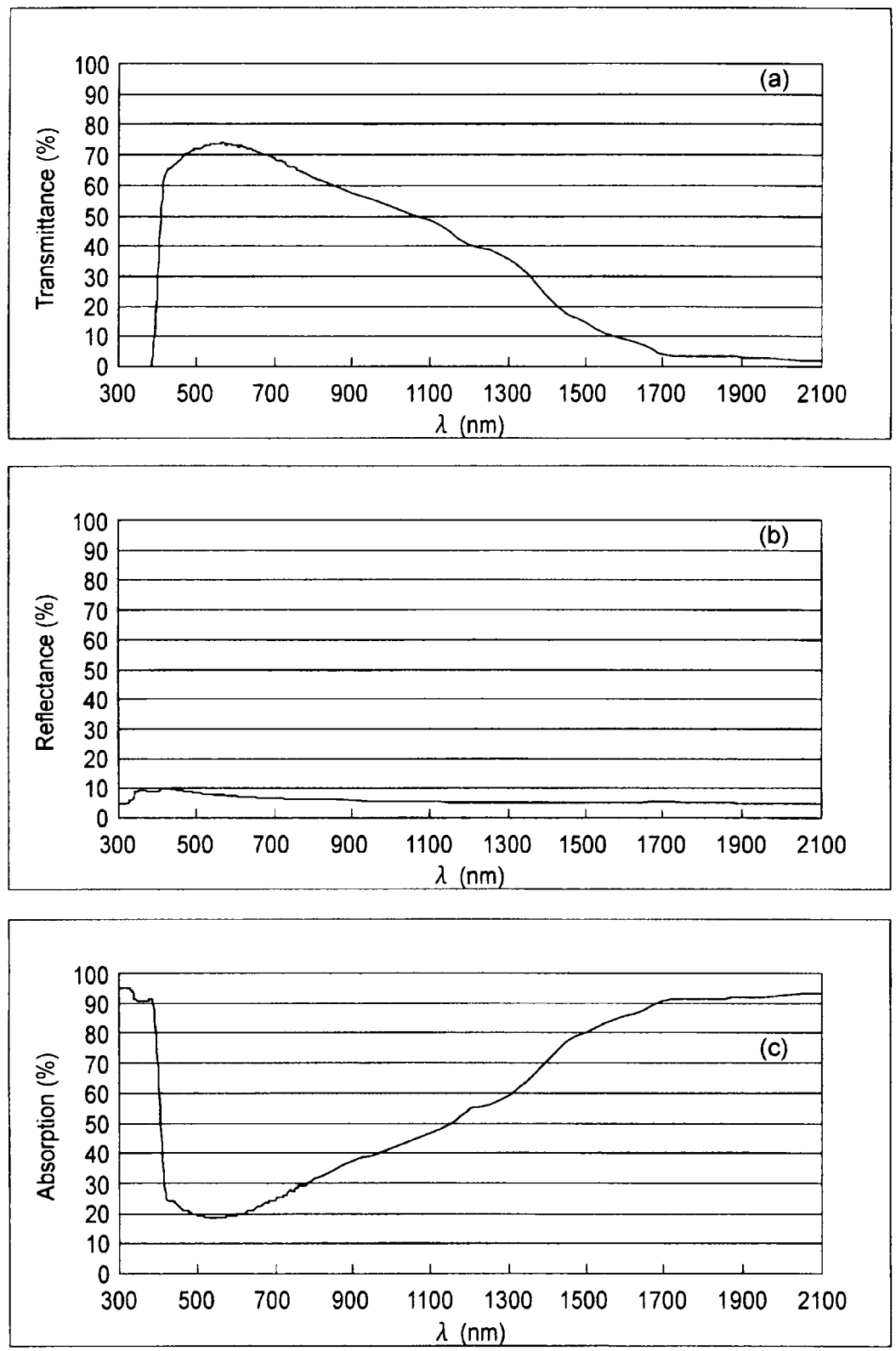
FIG. 12 is a graph (a) illustrating a spectral transmittance, a graph (b) illustrating a spectral reflectance and a graph (c) illustrating a spectral absorptivity of a laminated glass in Example 12.

In FIG. 12, a graph illustrating a spectral transmittance (FIG. 12(a)), a graph illustrating a spectral reflectance (FIG. 12(b)) and a graph illustrating a spectral absorptivity (FIG. 12(c)) are shown (the vertical axis represents the transmittance, the reflectance or the absorptivity (%), and the horizontal axis represents the wavelength (nm)).

The laminated glass in Example 12 is a laminated glass different from the laminated glass for a vehicle window of the present invention, since although the absorptivity to light at all wavelengths of from 1,100 to 1,300 nm is from 35 to 60%, the reflectance to light at all wavelengths of from 900 to 1,100 nm is not 30 to 50% and the reflectance to light at all wavelengths of from 900 to 1,500 nm is not at most 30%. The laminated glass for a vehicle window of the present invention, which has an increased reflectance to light at all wavelengths of from 900 to 1,100 nm as compared with the laminated glass in Example 12, can significantly reduce the transmittance to light at all wavelengths of from 900 to 1,500 nm, although its absorptivity to light at all wavelengths of from 1,100 to 1,300 nm is at the same level. Namely, it can reflects light in a wavelength region which is significantly influential over the heat insulating performance as far as possible without excessively absorbing the light in the laminated glass while securing the radio wave transmission properties, and can suppress the transmittance low.

INDUSTRIAL APPLICABILITY

According to the laminated glass for a vehicle window of the present invention, by reflecting the solar energy as far as possible without adsorbing it in the laminated glass, transmission of the solar energy entering the car interior can be suppressed, and the increase in the car interior temperature can be suppressed. By using such a laminated glass for a vehicle window, the increase in the car interior temperature can be prevented in an environment to be subjected to sun light, such as during traveling in the daytime or during parking, and the frequency of use or the load of air conditioners can be reduced, such contributes to improvement in the mileage of a vehicle or to suppression of the increase in the mileage.

The laminated glass for a vehicle window of the present invention is suitably used particularly for a windshield of an automobile and in addition, it can be used for a moving window, a side fixed window, a backlight, a roof window and the like. When it is used for all such windows of an automobile, it can more remarkably prevent the temperature increase in the automobile.

The entire disclosures of Japanese Patent Application No. 2005-235726 filed on Aug. 16, 2005 and Japanese Patent Application No. 2005-254904 filed on Sep. 2, 2005 including specifications, claims, drawings and summaries are incorporated herein by reference in their entireties.

What is claimed is:

1. A laminated glass for a vehicle window, which comprises a first glass plate, a second glass plate having an infrared reflection film having a sheet resistance of at least 1 kΩ/□, and an interlayer having infrared shielding fine particles dispersed therein, interposed between the first glass plate and the second glass plate, the first glass plate being disposed on the car interior side, wherein the infrared reflection film comprises a stacked coating film (X) and a thin film (Y), the stacked coating film (X) has a coating film (1) made of a high refractive index inorganic material having a refractive index of at least 1.90 and a coating film (2) made of a low refractive index inorganic material having a refractive index of at most 1.56 wherein, from the glass plate side, beginning with coating film (1), coating film (1) and coating film (2) are alternately stacked, and the total number of coating film (1) and coating film (2) in stack (X) is at least 3; and coating film (1) has a geometrical thickness of 70 to 150 nm, and coating film (2) has a geometrical thickness of 100 to 200 nm, the thin film (Y) has a multilayer structure made of an inorganic material on the non-glass plate side of the stacked coating film (X), the thin film (Y) and the coating film of the stacked coating film (X) are in contact with each other; and the thin film (Y) is a multilayer film having a high refractive index layer (c) made of a high refractive index inorganic material having a refractive index of at least 1.90 and having a geometrical thickness of from 5 to 40 nm and a low refractive index layer (d) made of a low refractive index inorganic material having a refractive index of at most 1.56 and having a geometrical thickness of from 5 to 40 nm alternately stacked in a totally even number of layers, and the layer in contact with the coating film (1) of the stacked coating film (X) is the low refractive index layer (d).

2. The laminated glass for a vehicle window according to claim 1, wherein at least one coating film (1) is a single layer film (1a) of titanium oxide or titanium oxynitride.

3. The laminated glass for a vehicle window according to claim 1, wherein at least one coating film (1) is a high refractive index multilayer film (1b) having a multilayer structure comprising at least two layers made of different high refractive index inorganic materials, and at least one layer of the high refractive index multilayer film (1b) is a layer of titanium oxide or titanium oxynitride.

4. The laminated glass for a vehicle window according to claim 3, wherein at least one layer of the high refractive index multilayer film (1b) is a layer of titanium oxide or titanium oxynitride, and at least one other layer of the high refractive index multilayer film (1b) is a layer of zirconium oxide.

5. The laminated glass for a vehicle window according to claim 1, wherein the coating film (X) comprises two high refractive index multilayer coating films (1b-1) containing a layer of zirconium oxide and a layer of titanium oxide or titanium oxynitride, having a total geometrical thickness of from 70 to 150 nm, and the coating film (2) present between the two high refractive index multilayer coating films (1b-1).

6. The laminated glass for a vehicle window according to claim 1, wherein the coating film (2) is a layer of silicon oxide.

7. The laminated glass for a vehicle window according to claim 1, wherein the high refractive index layer (c) of the thin film (Y) is a layer of titanium oxide, and the low refractive index layer (d) of the thin film (Y) is a layer of silicon oxide.

8. The laminated glass for a vehicle window according to claim 1, wherein the geometrical thickness of the high refractive index layer (c) of the thin film (Y) is from 7 to 11 nm, and the geometrical thickness of the low refractive index layer (d) of the thin film (Y) is from 25 to 35 nm.

9. The laminated glass for a vehicle window according to claim 1, wherein with respect to light incident from the second glass plate side, the reflectance to light at all wavelengths of from 900 to 1,100 nm is from 30 to 50%, the absorptivity to light at all wavelengths of from 1,100 to 1,300 nm is from 35 to 60%, and the transmittance to light at all wavelengths of from 900 to 1,500 nm is at most 30%.

10. The laminated glass for a vehicle window according to claim 1, wherein with respect to light incident from the second glass plate side, the reflectance to light at all wavelengths of from 900 to 1,100 nm is from 30 to 50%, the absorptivity to light at all wavelengths of from 1,100 to 1,300 nm is from 40 to 60%, and the transmittance to light at all wavelengths of from 900 to 1,500 nm is at most 30%.

11. The laminated glass for a vehicle window according to claim 1, wherein with respect to light incident from the second glass plate side, the reflectance to light at a wavelength of 900 nm is from 20 to 40%, the reflectance to light at all wavelengths of from 1,000 to 1,100 nm is from 30 to 50%, the absorptivity to light at all wavelengths of from 1,100 to 1,300 nm is from 35 to 60%, and the transmittance to light at all wavelengths of from 900 to 1,500 nm is at most 30%.

12. The laminated glass for a vehicle window according to claim 9, wherein with respect to light incident from the second glass plate side, the absorptivity to light at all wavelengths of from 900 to 1,100 nm is from 30 to 50%.

13. The laminated glass for a vehicle window according to claim 9, wherein with respect to light incident from the second glass plate side, the reflectance to light at all wavelengths of from 1,100 to 1,300 nm is from 20 to 40%.

14. The laminated glass for a vehicle window according to claim 1, which has a visible light transmittance to light incident from the second glass plate side of at least 70%.

* * * * *